(12) United States Patent
Maki

(10) Patent No.: US 10,281,060 B2
(45) Date of Patent: *May 7, 2019

(54) AIR BRAKE HOSE SUPPORT BRACKET

(71) Applicant: Ireco, LLC, Elmhurst, IL (US)

(72) Inventor: Brian G. Maki, Wood Dale, IL (US)

(73) Assignee: IRECO, LLC, Elmhurst, IL (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/448,932

(22) Filed: Mar. 3, 2017

(65) Prior Publication Data
US 2017/0174200 A1     Jun. 22, 2017

Related U.S. Application Data

(63) Continuation of application No. 14/528,108, filed on Oct. 30, 2014, now Pat. No. 9,625,060.

(51) Int. Cl.
*B61G 5/00* (2006.01)
*F16L 3/12* (2006.01)
(Continued)

(52) U.S. Cl.
CPC .......... *F16L 3/1222* (2013.01); *B60T 17/046* (2013.01); *B61G 5/08* (2013.01); *B61H 11/06* (2013.01);
(Continued)

(58) Field of Classification Search
CPC ... B61G 5/00; B61G 5/02; B61G 5/06; B61G 5/08; B61G 7/00; B61G 7/10; B61G 7/12
See application file for complete search history.

(56) References Cited

U.S. PATENT DOCUMENTS 743,796 A    11/1903   Allan et al.
2,165,330 A     7/1939   Bazeley
(Continued)

FOREIGN PATENT DOCUMENTS

CA     2 492 979     9/2012
GB     1165470     10/1969

OTHER PUBLICATIONS

WABTEC Corporation, Freight Car Draft Arrangements, Student Workbook TP2009, Feb. 2003.
(Continued)

*Primary Examiner* — Robert J McCarry, Jr.
(74) *Attorney, Agent, or Firm* — Cook Alex Ltd.

(57) ABSTRACT

A railway car air brake hose support bracket has an upper portion with first and second attachment members, a lower portion and an air hose connector. The first attachment member enters into and engages a portion of an accessible compartment of an uncoupling mechanism housing below the coupler head, and the second attachment member is secured to an air brake hose support lug of the railway car coupler. The air brake hose connector engages an air brake hose assembly and suspends this hose assembly from the railway coupler at a predetermined distance above the rail bed. A method of installing the hose support bracket includes positioning the first and second attachment members, securing them in place, and attaching one or more railway brake hose units to the air hose connector, either before or after this positioning and securing of the upper portion of the bracket.

34 Claims, 28 Drawing Sheets

(51) Int. Cl.
*B61H 11/06* (2006.01)
*F16L 3/127* (2006.01)
*B61H 13/34* (2006.01)
*B60T 17/04* (2006.01)
*B61G 5/08* (2006.01)

(52) U.S. Cl.
CPC .............. *B61H 13/34* (2013.01); *F16L 3/127* (2013.01); *F16L 3/1218* (2013.01)

(56) References Cited

U.S. PATENT DOCUMENTS

| | | |
|---|---|---|
| 2,296,170 A | 9/1942 | Lockhart |
| 3,312,481 A | 4/1967 | Temple |
| 3,344,935 A | 10/1967 | Stewart et al. |
| 3,552,580 A | 1/1971 | Cope |
| 3,556,314 A | 1/1971 | Punwanl |
| 3,587,868 A | 6/1971 | Yates |
| 3,589,530 A | 6/1971 | Metzger |
| 3,592,425 A | 7/1971 | Randolph |
| 3,784,030 A | 1/1974 | Chierici |
| 4,301,932 A | 11/1981 | Altherr |
| 4,876,885 A | 10/1989 | Martin |
| 4,986,500 A | 1/1991 | Campbell |
| 6,568,649 B1 | 5/2003 | Schmitt |
| 6,581,791 B2 | 6/2003 | Flint et al. |
| 6,745,910 B2 | 6/2004 | Flint et al. |
| 6,871,732 B2 | 3/2005 | Flint et al. |
| 7,267,306 B2 | 9/2007 | Eason et al. |
| D583,652 S | 12/2008 | Vermesi et al. |
| 7,467,812 B2 | 12/2008 | Ring et al. |
| 7,631,774 B2 | 12/2009 | Foxx et al. |
| 7,637,381 B2 | 12/2009 | Foxx et al. |
| 7,757,995 B2 | 7/2010 | McKiernan |
| 7,780,022 B2 | 8/2010 | Vermesi et al. |
| 7,850,128 B2 | 12/2010 | Murphy |
| 8,066,231 B2 | 11/2011 | McKiernan |
| 8,201,779 B2 | 6/2012 | Hua et al. |
| 9,365,220 B2 | 6/2016 | Miner et al. |
| 9,366,361 B2 | 6/2016 | Miner et al. |
| 9,625,060 B2 * | 4/2017 | Maki ...................... B61H 11/06 |
| 2003/0102415 A1 | 6/2003 | Schmitt |
| 2007/0267377 A1 | 11/2007 | McKiernan |

OTHER PUBLICATIONS

Strato, CMBA Coupler Mounted Bracket Instruction Manual and Guidelines, Jun. 16, 2014.

* cited by examiner

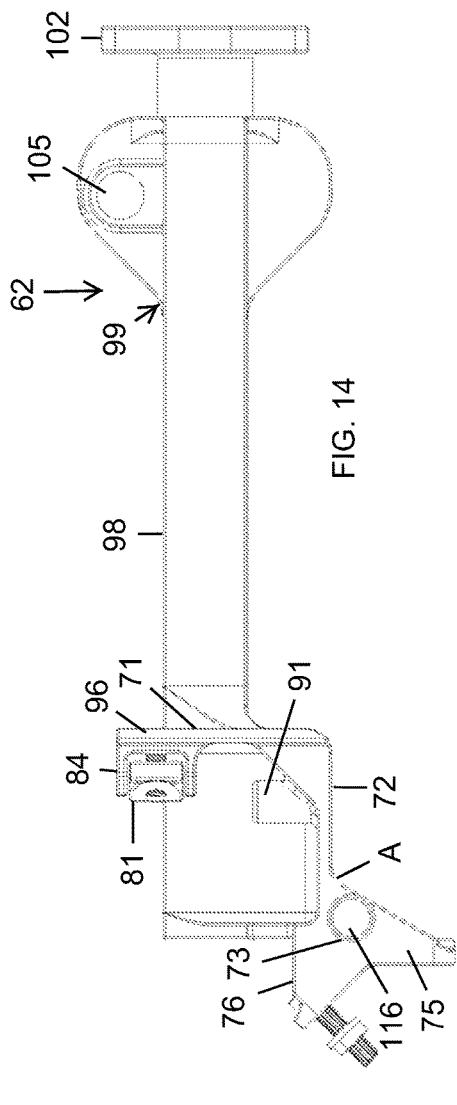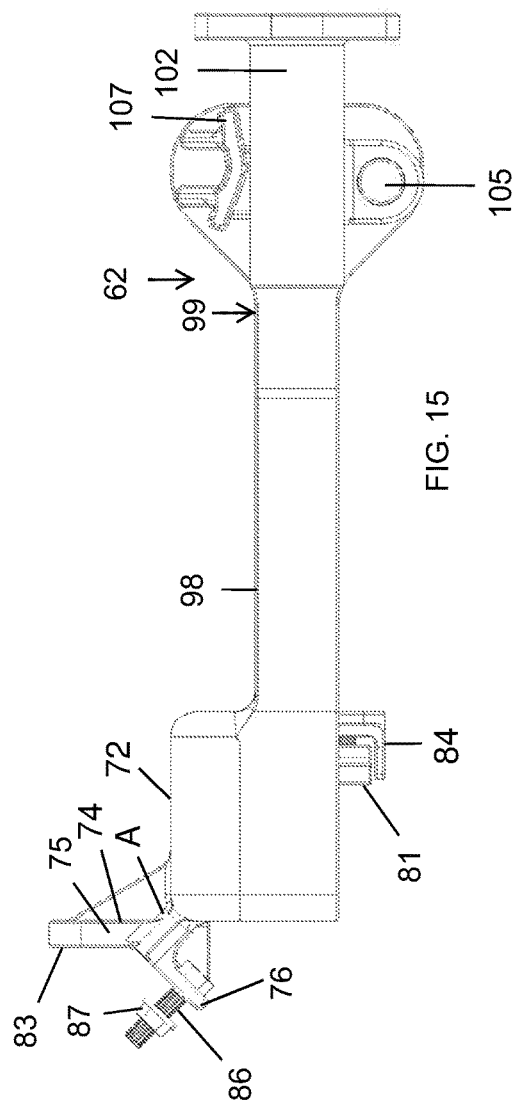

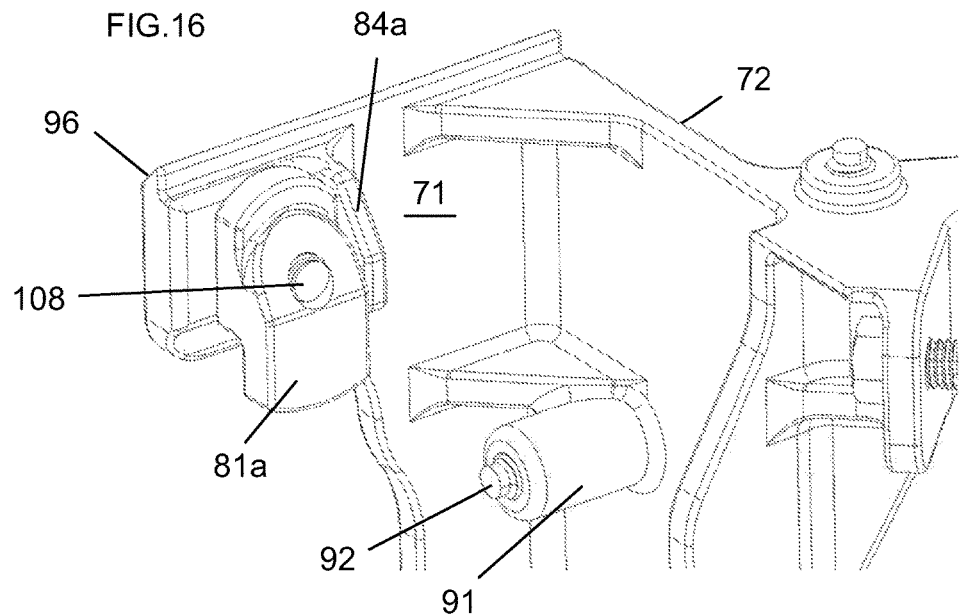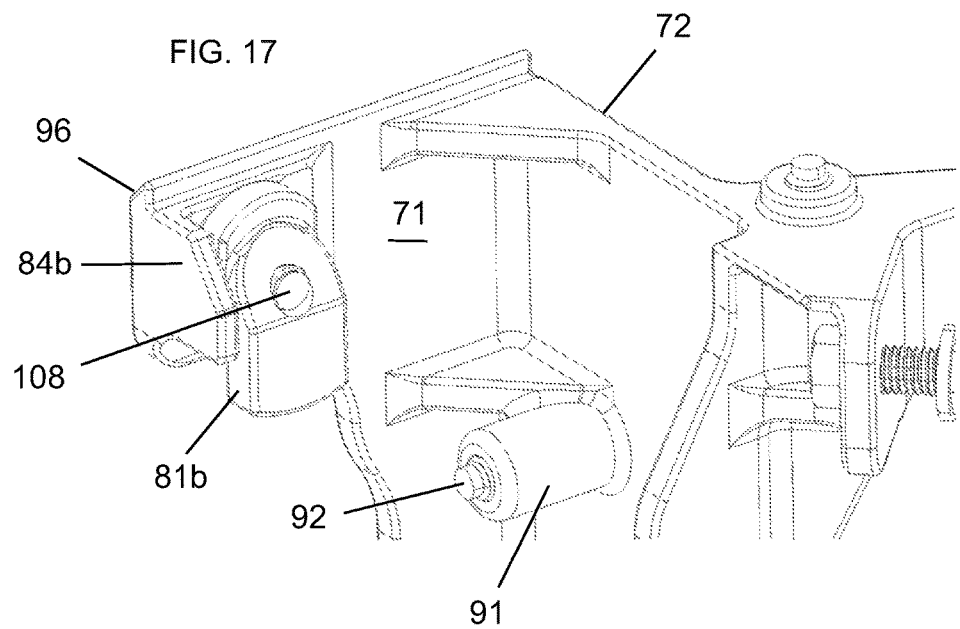

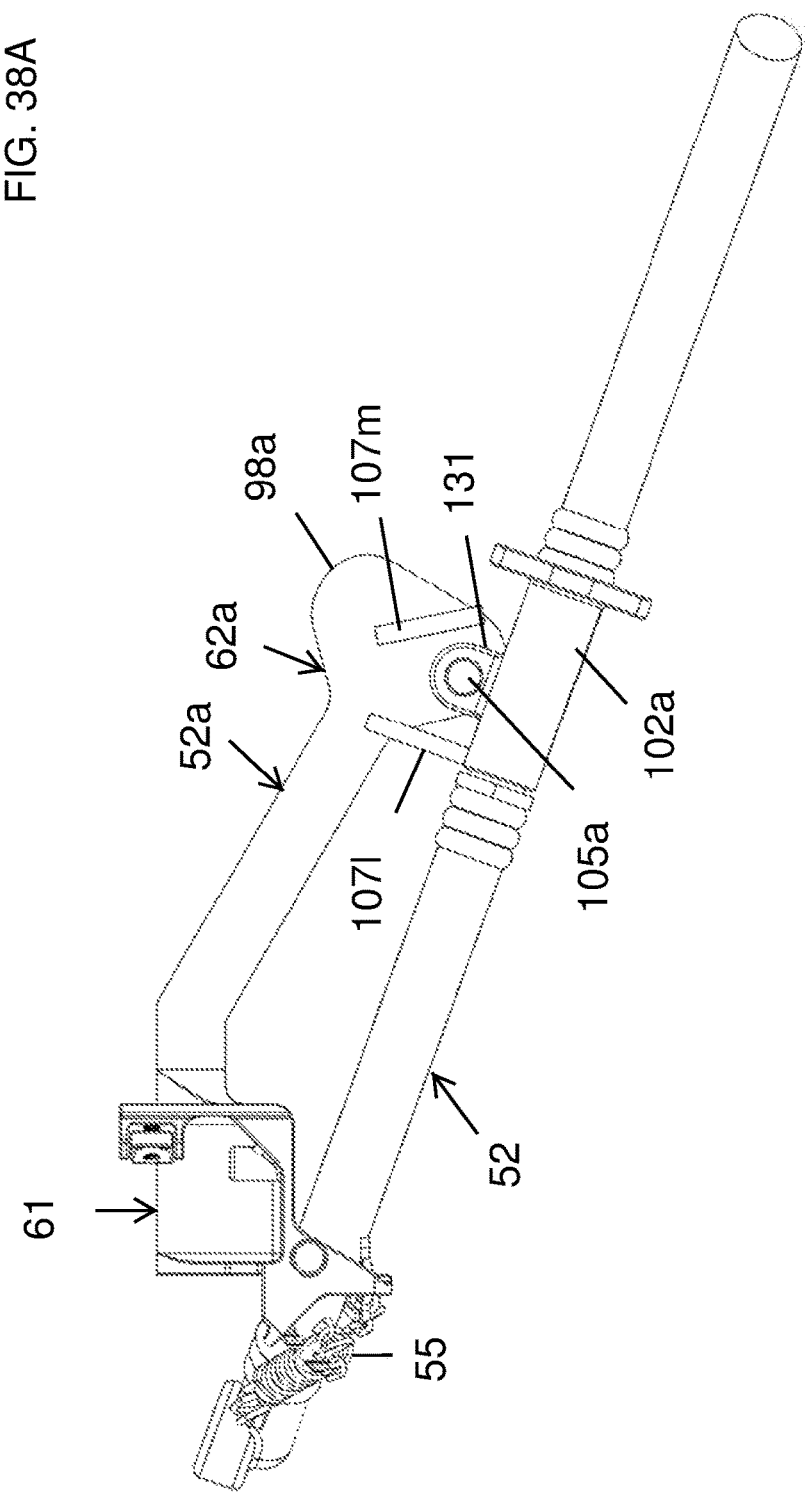

AIR BRAKE HOSE SUPPORT BRACKET

This application is a continuation of and claims the benefit of U.S. application Ser. No. 14/528,108, filed Oct. 30, 2014, hereby incorporated by reference hereinto.

BACKGROUND

Field of the Disclosure

The present subject matter relates to supports for railway car air brake hoses, and particularly to railway car air brake hose support brackets that are attached to a railway car coupler and provide support for air brake hose assemblies, which brackets are especially suitable for so-called cushioned railway cars in that the hose support brackets move with the railway car coupler.

Description of Related Art

Suspension devices for railway car air brake hose assemblies are known for suspending the hose assemblies from a variety of different locations of a railway car, including frames, bodies, coupler yokes and couplers themselves. Some suspension devices are intended to allow controlled and limited vertical movement of the air brake hose assemblies that they suspend, such as those resembling flexible and/or adjustable straps. A typical function of such devices is to provide a secondary or safety support mechanism for the air brake hose assembly or a portion of the hose assembly. Other suspension devices within this general category are the spring-style air brake hose supports disclosed in co-pending application of applicant, namely Ser. No. 14/102,049, filed Dec. 13, 2013, incorporated by reference hereinto. Another category of suspension devices is intended to provide primary support for an air brake hose mechanism and typically strive to avoid or seriously restrict any vertical movement of the thus suspended air brake hose assembly at the location where the suspension device engages the air brake hose assembly that it is suspending. The present disclosure falls within this latter category.

Often railway air brake hose assembly suspension is carried out by a combination of suspension devices that includes one or more of each category. By such combination systems, the different categories or types cooperate with each other to safely maintain an air brake hose assembly in place during use and transport while allowing for limited movement of the air brake hose assembly in order to facilitate connection of the air brake hose assembly to the remainder of the railway train air brake mechanism and line along the train while permitting the air brake hose assembly to move as needed in order to avoid undesired uncoupling of air brake connections between railway cars, while still restricting movement of the hose to an extent that uncoupling is accomplished only when desired.

Typically, railway car air hose support systems are provided on each end of a railway car to support the air brake hose assembly above the rails, which function is especially important during transport of the train of railway cars, including while operating at high speed and/or negotiating turns. Some prior art hose support systems attach to the coupler that is at the remote end of a coupler shank that secures the coupler to the railway car. These supports fall into both categories noted hereinabove.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

As with other railway air brake hose supports, the present railway car air brake hose support brackets are provided to maintain a proper height above the rails and railroad ties and ballast while avoiding excessive railway hose movement that could lead to inadvertent separation of railway hose couplings and/or unintended sudden release of pressurized air along the railway train components. It will be appreciated that uncoupling of air brake hose assemblies along a railway train while in transport mode typically will cause emergency braking and perhaps excessively abrupt stopping of the train cars involved, which can lead to inconvenience and possible safety concerns. Damage to equipment and even derailment can be included in these concerns.

In achieving these types of functions of air brake hose support brackets, the present disclosure seeks to address an objective of having a very durable and securely mountable support bracket that still affords an important advantage of attachment to the coupler casting itself rather than to railway car bodies and/or frames and/or yokes, particularly important for railway cars having a so-called cushioning feature whereby the coupler and its yoke are allowed to move horizontally "into" the railway car in response to generally longitudinal forces experienced during operation, including coupling, braking, and negotiating curves. The present disclosure exhibits various advantages over prior structures including bracket units that mount to the coupler. These advantages, discussed in more detail hereinafter, include: easier, faster and more secure installation; greatly reducing susceptibility to damage due to bypassing couplers of adjoining railcars; avoidance of contact with the striker when the coupler is in the "buff" position (pushed all the way in toward the striker); enhanced universality by fitting on a variety of different coupler styles of different manufacturers; more secure attachment to the coupler; and avoidance of interference with other functions required of couplers.

In one aspect of this disclosure, the railway car air brake hose support bracket of the present disclosure is adapted to suspend a railway air brake hose assembly from a railway car coupler, the air brake hose support bracket having an upper portion with a first attachment member that connects to a coupler housing beneath a railway car coupler head and a second attachment member that connects to an air brake hose support lug of the railway car coupler, the first attachment member and the second attachment member being laterally spaced from each other. The bracket further includes a lower portion that has a grasping feature inward of the railway car with respect to the coupler along with an air hose connector that is adapted and structured to engage with an air brake hose assembly, the grasping feature securely engaging the air hose connector to the lower portion of the bracket, with the result that the air brake hose support bracket suspends the air brake hose assembly from the railway car coupler. In one embodiment, the air brake hose assembly is suspended so as to be at least partially below the lower portion; in another embodiment the air brake hose assembly is suspended so at to be generally alongside the lower portion of the railway car air brake hose support bracket.

In another aspect of this disclosure, a railway car air brake hose support bracket is provided that is adapted to suspend a railway air brake hose assembly from a railway car coupler. The air brake hose support bracket has a first attachment member that projects inward with respect to and connects to a coupler housing beneath a railway car coupler head, entering an upper compartment of the housing. A second attachment member connects to an air brake hose support lug in existence on the railway car coupler, the first attachment member and the second attachment member being horizontally spaced from each other. Both the first and second attachment members are below the railway car coupler head. The bracket further includes a portion lower than the first and second attachment members and a grasping feature inward of the railway car with respect to the coupler along with an air hose connector that is adapted and structured to engage with an air brake hose assembly, the grasping feature securely engaging the air hose connector to the lower portion. In one embodiment, at least part of the air hose connector being below the underside of the lower portion, with the result that the air brake hose support bracket suspends the air brake hose assembly from the railway car coupler.

In a further aspect of this disclosure, a railway car air brake hose support bracket of the present disclosure is adapted to suspend a railway air brake hose assembly from a railway car coupler, the air brake hose support bracket having an upper wrap-around portion with a first wall having a first attachment member that enters into and connects to a compartment of a coupler housing beneath a railway car coupler head and a second wall generally perpendicular to the first wall and having a projecting flange supporting a second attachment member that connects to an air brake hose support lug of the railway car coupler, the first attachment member and the second attachment member being laterally spaced from each other. The bracket further includes a lower portion that has an underside and a grasping feature inward of the railway car with respect to the coupler along with an air hose connector that is adapted and structured to engage with an air brake hose assembly, the grasping feature securely engaging the air hose connector to the lower portion. In embodiments at least part of the air hose connector is generally below or generally alongside or generally above the lower portion, with the result that the air brake hose support bracket suspends the air brake hose assembly from the railway car coupler.

In a further aspect of this disclosure, a railway car air brake hose support bracket of the present disclosure is adapted to suspend a railway air brake hose assembly from an upper compartment of an uncoupling mechanism housing of a railway car coupler, the air brake hose support bracket having a first attachment member and a second attachment member oriented with respect to each other such that, whether connected to each other by a member that directly or indirectly joins same, present a wrap-around effect with respect to the coupler. The first attachment member connects to a coupler housing beneath a railway car coupler head, and the second attachment member connects to an air brake hose support lug of the railway car coupler, the first attachment member and the second attachment member being laterally spaced from each other. The bracket further includes a lower portion that has an underside and a grasping feature inward of the railway car with respect to the coupler along with an air hose connector that is adapted and structured to engage with an air brake hose assembly while allowing rotation of the air hose connector, the grasping feature securely engaging the air hose connector to the lower portion, with at least part of the air hose connector being below the underside of the lower portion, with the result that the air brake hose support bracket suspends the air hose assembly from the railway car coupler. The range of rotation of the air hose connector can be restricted by stop member or members. In alternate arrangement, the air hose connector is movable (such as generally vertically) to avoid contact with the stop member or members, thereby increasing the range of rotational motion in order to facilitate attachment of the railway air brake hose assembly to the air hose connector. In one embodiment, the rotational motion is achieved by mounting the air hose connector to a single shaft; in another embodiment, a pair of shafts is utilized for this purpose, typically being guided by a slot pair.

In a further aspect of this disclosure, a railway car air brake hose support bracket assembly is provided that is adapted to suspend a railway air brake hose assembly from a railway car coupler, the air brake hose support bracket comprising: an upper wrap-around portion having a first wall with a first attachment member that projects into and connects to an opening into a shelf of an upper compartment of a coupler housing beneath a railway car coupler head. The upper wrap-around portion further has a second wall generally perpendicular to the first wall and a projecting flange from the second wall that is opposite of the first wall, the projecting flange having a second attachment member that connects to an air brake hose support lug beneath the railway car coupler head, the first attachment member and the second attachment member being generally horizontally spaced from each other, as installed. The bracket has a lower portion that has an underside and a grasping feature inward of the railway car with respect to the coupler as well as an air hose connector that is adapted and structured to engage with an air brake hose assembly, the grasping feature securely engaging the air hose connector to the lower portion, with at least part of the air hose connector being below the underside of the lower portion, whereby the air brake hose support bracket suspends the air brake hose assembly from the railway car coupler.

In an added aspect of this disclosure, a railway car air brake hose support bracket is adapted to suspend a railway air brake hose assembly from a railway car coupler, the air brake hose support bracket comprising an upper wrap-around portion having a first wall with a first attachment member that projects into and connects to an opening into a shelf of an upper compartment of a coupler housing beneath a railway car coupler head. This first attachment member projects inward with respect to the coupler housing and has an indent. As installed, the first attachment member enters into the upper compartment of the housing and is positioned, sized and shaped to engage at least an edge surface of an opening in a shelf in the housing. The upper wrap-around portion further has a second wall generally perpendicular to the first wall and a projecting flange from the second wall that is opposite of the first wall, the projecting flange having a second attachment member that connects to an air brake hose support lug beneath the railway car coupler head, the first attachment member and the second attachment member being generally horizontally spaced from each other, as installed. The bracket has a lower portion that has an underside and a grasping feature inward of the railway car with respect to the coupler as well as an air hose connector that is adapted and structured to engage with an air brake hose assembly, the grasping feature securely engaging the air hose connector to the lower portion, with at least part of the air hose connector being below the underside of the lower portion, whereby the air brake hose support bracket suspends the air brake hose assembly from the railway car coupler.

In a further aspect of this disclosure, a method is provided for suspending an air brake hose assembly from a railway car coupler, comprising: providing a railway car air brake hose support bracket with an upper wrap-around portion having a first attachment member and a second attachment member, a lower portion that has an underside, and an air hose connector at least a portion of which is below the lower portion underside; positioning the first attachment member into a coupler compartment below the coupler's head; positioning the second attachment member for engagement with an air brake hose support lug of the railway car coupler; securing the first attachment member to the coupler compartment and securing the second attachment member to the air brake hose support lug to rigidly attach the air brake hose support bracket to the railway car coupler; and attaching at least one railway air brake hose component to the air hose connector thereby suspending a railway air brake hose assembly from the railway car coupler grasping feature securely engaging the air hose connector to the lower portion, with at least part of the air hose connector being below the underside of the lower portion, whereby the air brake hose support bracket suspends the air brake hose assembly from the railway car coupler.

In yet another aspect of this disclosure, a method is provided for suspending an air brake hose assembly from a railway car coupler, comprising: providing a railway car air brake hose support bracket with an upper wrap-around portion having a first attachment member and a second attachment member, a lower portion that has an underside, and an air hose connector at least a portion of which is below the lower portion underside; positioning the first attachment member into a coupler compartment below the coupler's head; positioning the second attachment member for engagement with an air brake hose support lug of the railway car coupler; securing the first attachment member to the coupler compartment and securing the second attachment member to the air brake hose support lug to rigidly attach the air brake hose support bracket to the railway car coupler; and attaching at least one railway air brake hose component to the air hose connector thereby suspending a railway air brake hose assembly from the railway car coupler grasping feature securely engaging the air hose connector to the lower portion, with at least part of the air hose connector being below the underside of the lower portion, whereby the air brake hose support bracket suspends the air brake hose assembly from the railway car coupler. The method further includes entering the first attachment member into the coupler compartment and, before or after securing the first attachment member, hooking a leading portion of the first attachment member into engagement with at least one edge of an opening in a shelf of the coupler compartment.

BRIEF DESCRIPTION OF THE DRAWINGS

FIG. 14 is a top plan view of the embodiment of FIG. 1;

FIG. 15 is a bottom plan view of the embodiment of FIG. 1;

FIG. 16 is a perspective view of a further embodiment at the upper portion of a support bracket;

FIG. 17 is a perspective view of an additional embodiment at the upper portion of a support bracket;

FIG. 38A is a bottom view of the FIG. 38 embodiment; and

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
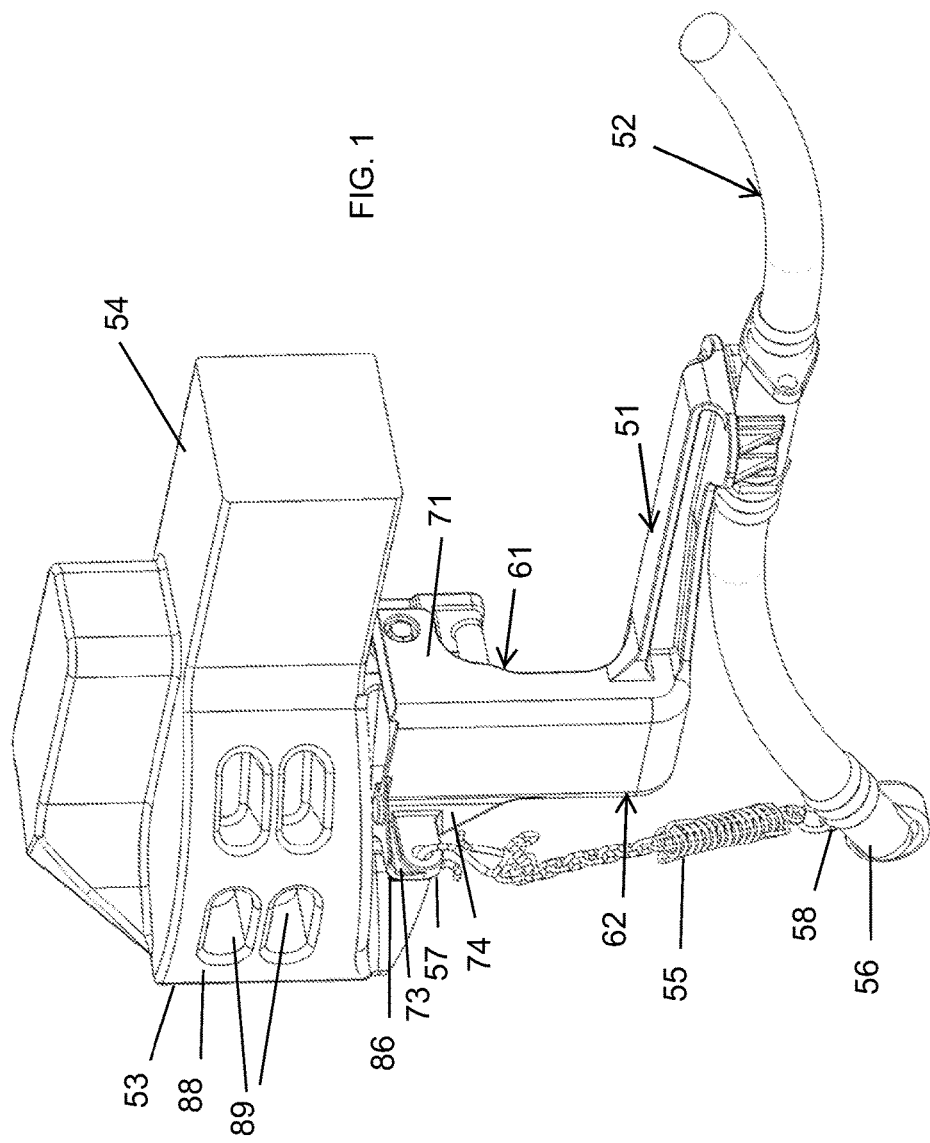
FIG. 1 is perspective view, looking generally forward from the rear left, of a railway air brake hose support bracket connected to a railway car coupler, including to an uncoupling mechanism housing on the underside of the coupler, and from which a brake hose assembly is suspended.
Figure 2:
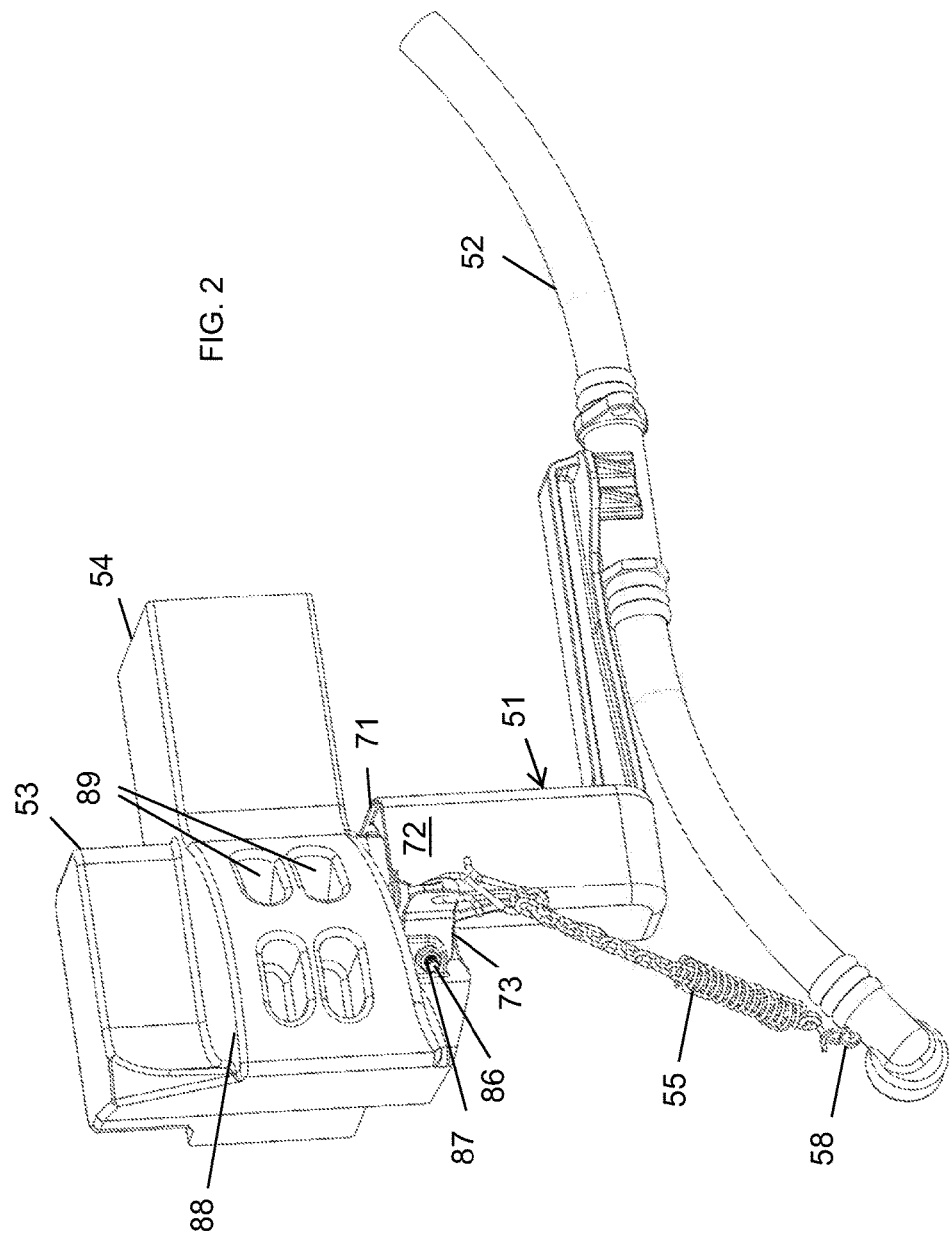
FIG. 2 is further perspective view, looking generally rearward from the left front of the embodiment of FIG. 1.

FIG. 1 and FIG. 2 illustrate an embodiment of a railway car air brake hose support bracket or bracket assembly, generally designated at 51. This support bracket 51 is illustrated in its in-use condition by which one end of the bracket 51 is attached to a railway hose assembly generally designated at 52, while its other end is attached to a railway car coupler generally designated at 53. Coupler 53 and its shank 54 are secured to the railway car (not shown), typically through a yoke (not shown) by structures and approaches well known in the art. Also shown is a support assembly 55 to provide a secondary or safety support mechanism for the air brake hose while allowing limited vertical movement along the support assembly 55. The illustrated support assembly takes the form of a spring-style support assembly which suspends the air hose assembly at its glad hand end 56. However, many other styles and types of air hose support assemblies can be used. In this embodiment, the support assembly 55 is secured at its other (upper) end to a component of the support bracket 51, which in turn is supported from the railway coupler 53, discussed in greater detail herein. More particularly, in this illustrated embodiment, one end portion of the support assembly 55 is inserted through an orifice 57 of the support bracket 51. The other end of the support assembly 55 is inserted through an opening of a hanger bracket 58 of the railway hose assembly 52.

With more particular reference to the railway car air hose support bracket 51 that is illustrated in this embodiment, same has an upper portion 61 that is adapted for attachment to the railway coupler and a lower portion 62 that is adapted for attachment to the air brake hose assembly 52. While the upper portion 61 can be considered to "wrap around" a portion of the railway car coupler 53, the wrap-around aspects need not require full overlying coverage of the portion of the coupler 53 that the upper portion 61 engages. The term wrap-around when used herein indicates the upper portion 61 engages multiple locations of the coupler's lower features and thus is secured at more than one location. In a general sense, this support bracket 51 secures the air brake hose assembly 52 at a height above the track bed that does not vary to any significant extent during use, including during train movement at various speeds and/or track paths. More specifically, this maintenance of height is with respect to the portion of the air brake hose assembly to which the support bracket 51 is attached, and same is guided by safety and performance standards such as those of the AAR (Association of American Railroads).

Figure 3:
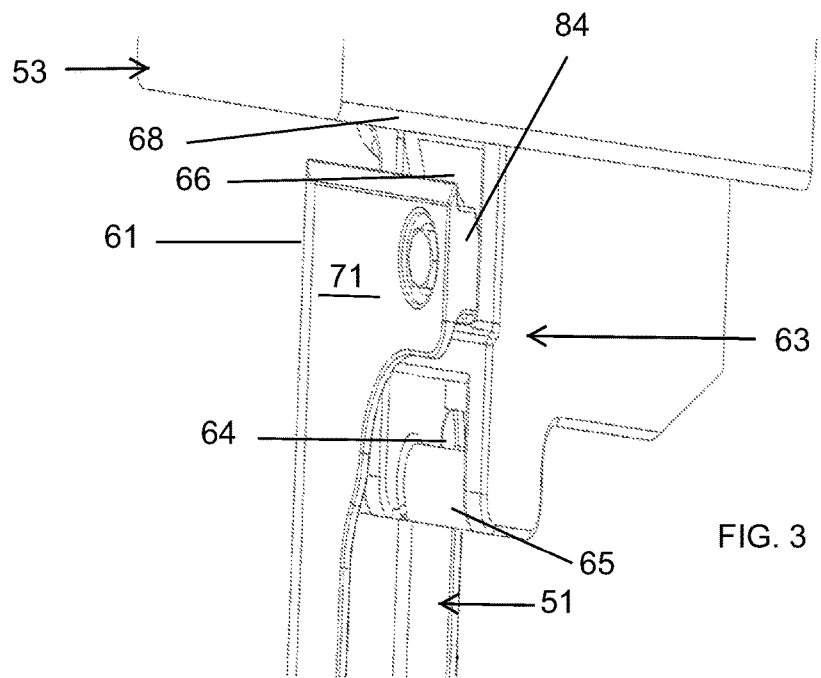
FIG. 3 is a detail perspective view illustrating certain engagement details between the support bracket and the coupler.
Figure 4:
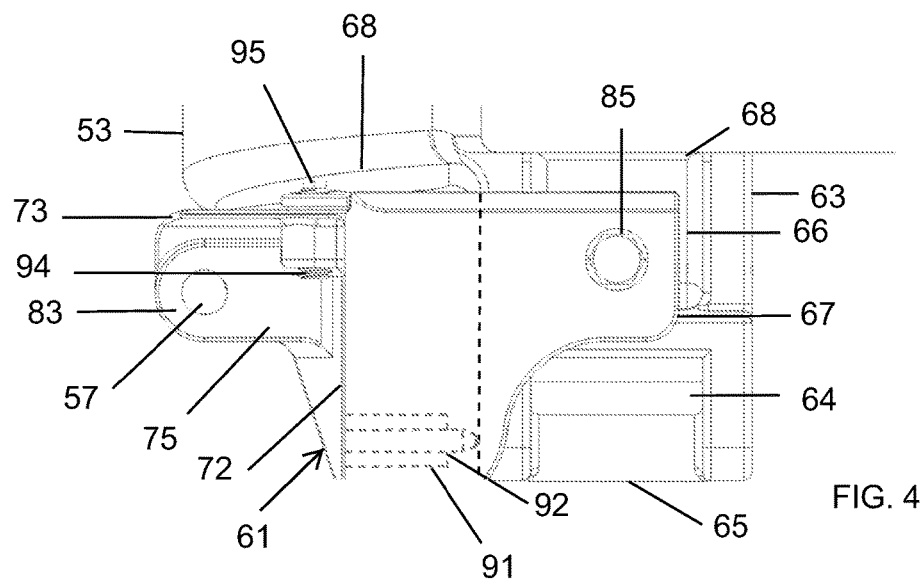
FIG. 4 is a detail elevation view further illustrating certain engagement details between the support bracket and the coupler.
Figure 5:
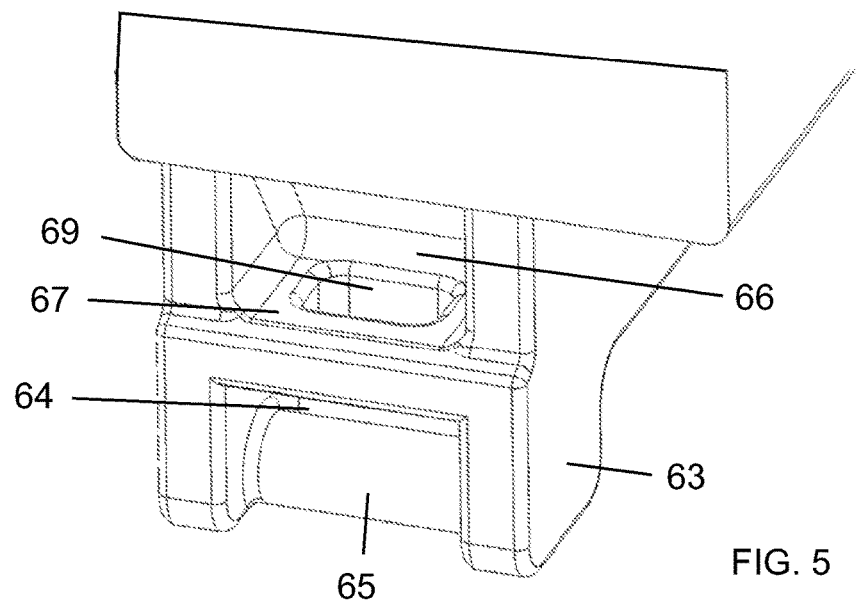
FIG. 5 is detail perspective view of a portion of the coupler underside somewhat schematically illustrating typical coupler underside housing details.
Figure 6:
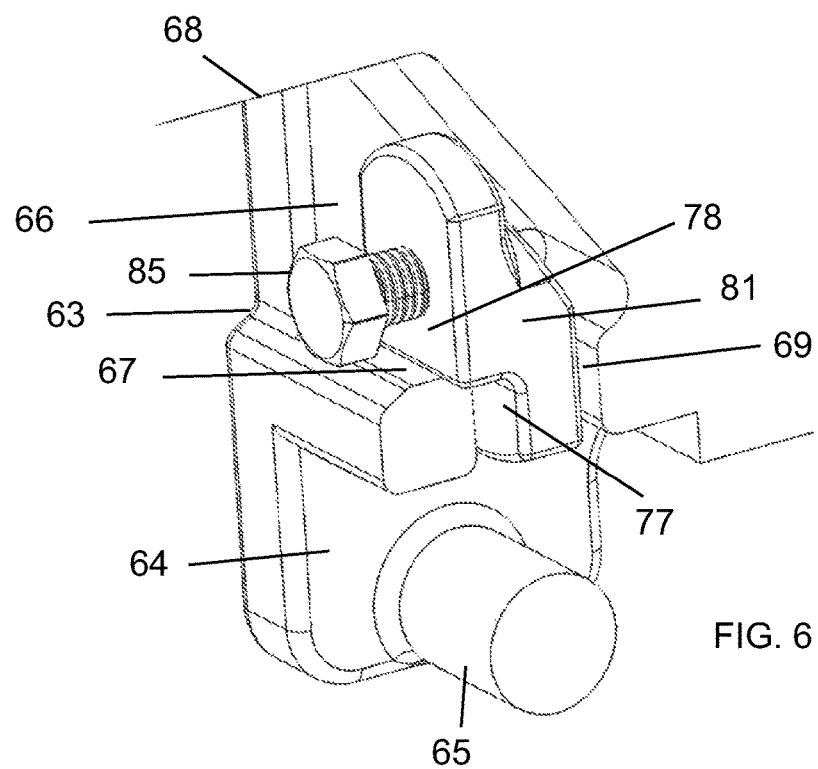
FIG. 6 is a cut-away perspective view of the coupler underside housing of FIG. 5, with an embodiment of an attachment component located therein.

FIG. 3 and FIG. 4 further illustrate the upper portion 61 in an embodiment of a wrap-around structure, and its attachment details for this embodiment. This illustrates a generally direct wrap-around embodiment includes walls that wrap around part of a lower portion of the railway car coupler that is found on the underside of various railway car couplers such as 53 shown in several of the drawings hereof. This lower portion typically is present at the underside area of a coupler beneath the coupler head 88 and is designed primarily as a component of an uncoupling mechanism of the coupler. As is generally known in the art, the knuckle of a coupler moves between its closed (or coupled) condition to its open (or uncoupled) condition by positioning one end of a relatively long uncoupling lever into a lock lifter assembly (not shown) associated with (typically suspended from) an uncoupling mechanism housing, generally designated at 63, the lock lifter assembly usually being attached at a slot 64 defined at its bottom extent by a hanger 65 and having a shelf 67 thereabove. An upper compartment 66 bounded at its bottom extent by the shelf 67 and the underside 68 of coupler 53 typically is included in coupler castings, with a shelf opening 69 (FIG. 5) between the slot 64 and the floor of shelf 67. The upper compartment 66 is rearward facing with respect to the coupler 53.

Figure 9:
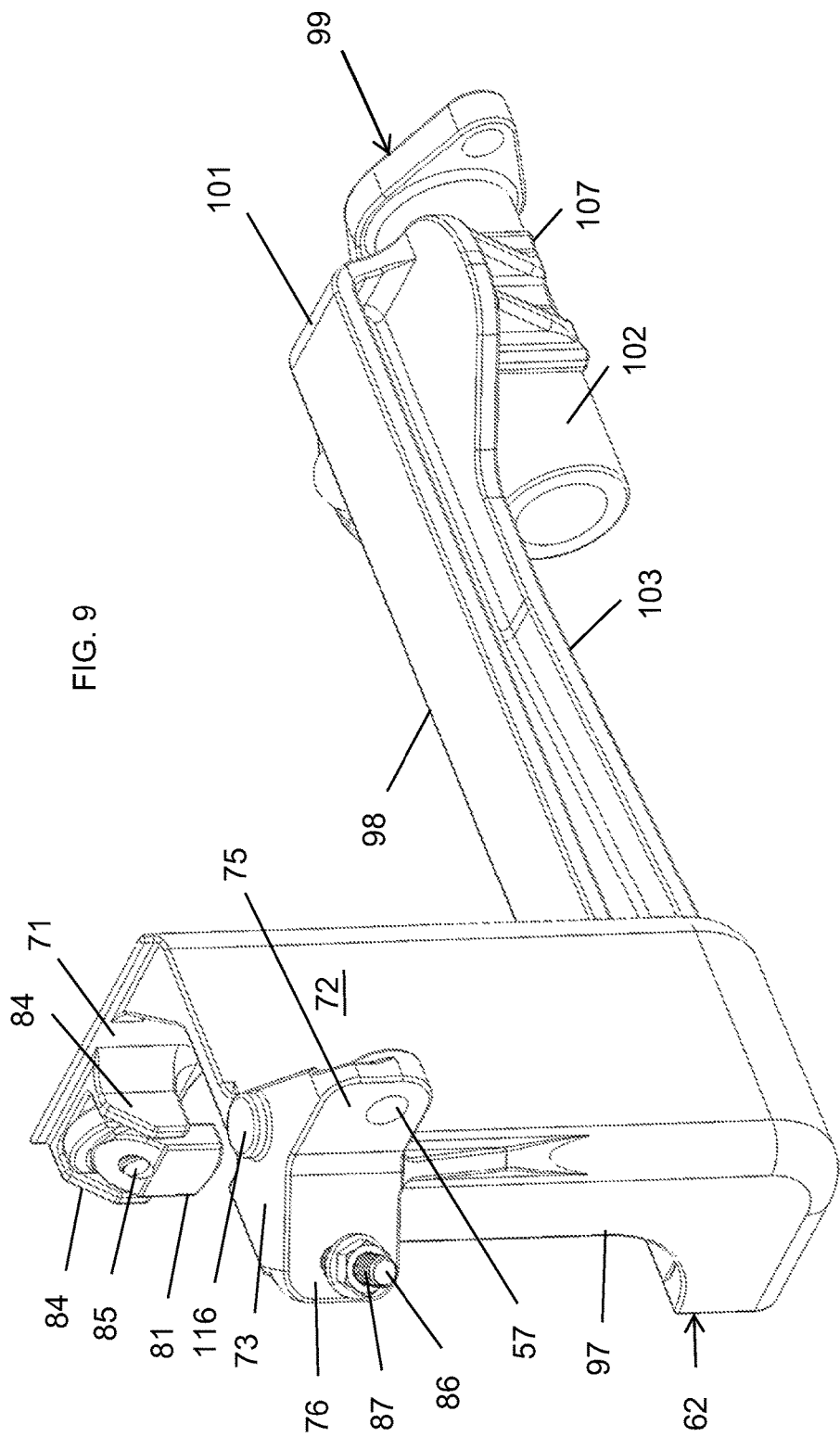
FIG. 9 is a further perspective view of the embodiment of FIG. 1.
Figure 10:
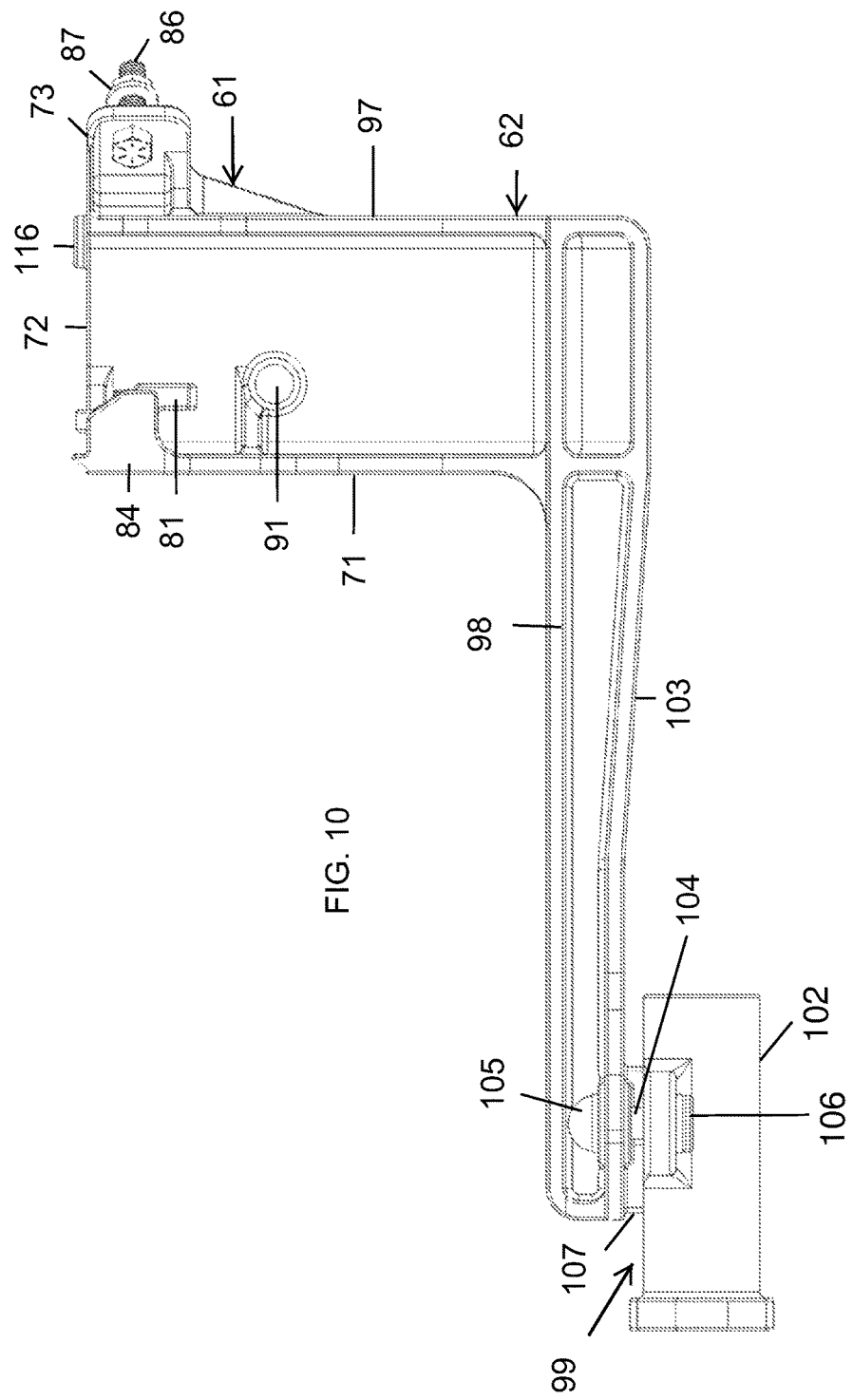
FIG. 10 is a back elevation view of the embodiment of FIG. 1.
Figure 11:
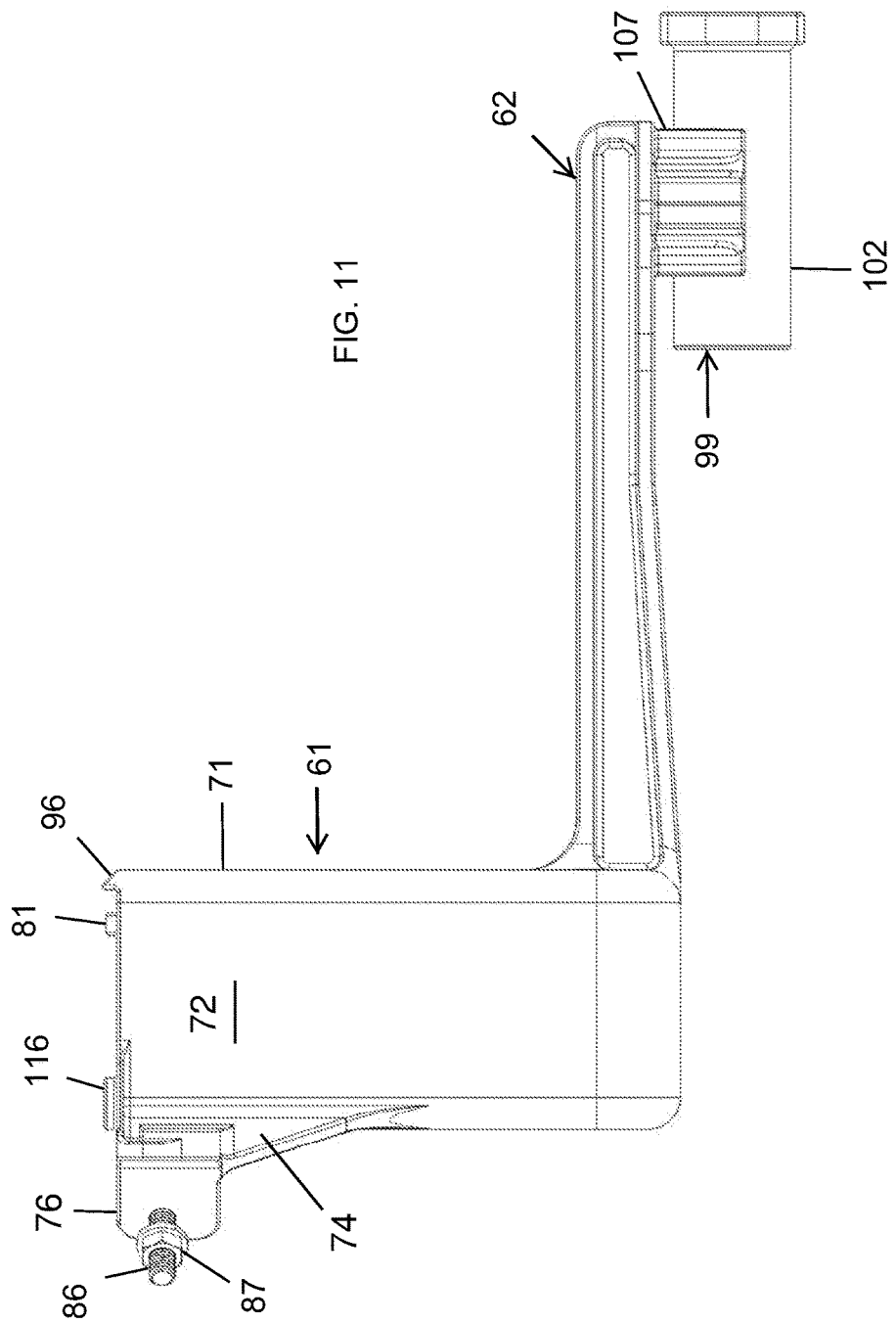
FIG. 11 is a front elevation view of the embodiment of FIG. 1.
Figure 12:
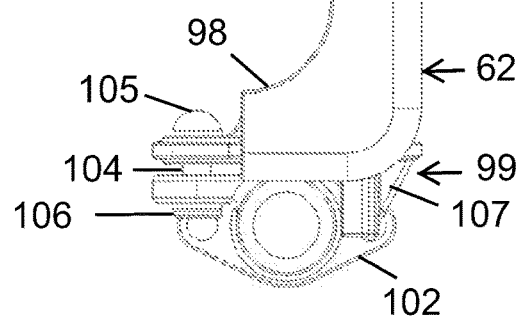
FIG. 12 is a left elevation view of the embodiment of FIG. 1.
Figure 13:
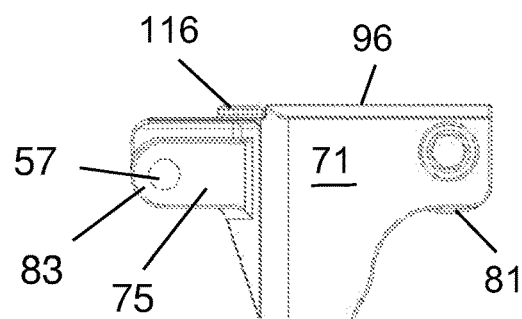
FIG. 13 is a right elevation view of the embodiment of FIG. 1.

In the illustrated embodiment of FIG. 1, FIG. 2 and FIG. 3, the upper portion 61 includes a first wall 71 and a second wall 72. Second wall 72 has a support bracket flange, generally designated at 73, which in this embodiment is of a branched structure and has an outward facing branch 75 and an inward facing branch 76, each having a separate and different function as noted herein. The illustrated outward facing branch 75 has a subsidiary wall 74. The second wall 72 and the subsidiary wall 74 form an obtuse angle "A" (FIG. 7, FIG. 9 and FIG. 14), although other angular relationships are possible provided the function of the branch 75 is fulfilled.

A mounting element 81 is positioned inward of the first wall 71 and interacts with the uncoupling mechanism housing 63 of the coupler 53 in connection with the secure mounting of the railway support bracket 52. As evident from the drawings, the generally wrap-around nature of the upper wrap-around portion 61 of the bracket 52 generally indicates that the first wall 71 portion overlies part of the rearward-facing upper compartment 66 of the uncoupling mechanism housing 63, while second wall 72 of the wrap-around portion overlies a sidewall of the uncoupling mechanism housing 63. The flange 73 continues with the overall overlying aspect and interacts with another element along the underside of the coupler 53, namely the coupler air brake hose support lug 82, the illustrated embodiment including mounting attachment between the inward facing branch 76 of the flange 73 and the existing air brake hose support lug 82 of the coupler 53. Inasmuch as this attachment feature renders the lug 82 unavailable for air brake hose support, the bracket 52 typically also includes an auxiliary air brake hose support lug 83 that essentially performs the function of the lug 82 of the coupler 53. In several of the illustrated embodiments, this auxiliary lug 83 is located on the outward facing branch 75 of the flange 73.

With particular reference to the embodiment and details of FIG. 3, FIG. 4, FIG. 5 and FIG. 6, the mounting element 81 of the bracket or bracket assembly enters the housing 63 and rests within its opening 69, providing easy and secure attachment of the bracket first wall 71 to the uncoupler mechanism housing 63. In some embodiments, this mounting element 81 has one or more stops 84 that interfere with unobstructed movement of the mounting element 81, particularly in those embodiments where the mounting element 81 is movable and in need of obstruction to facilitate installation of the bracket into the uncoupler mechanism housing 63. For example, the stop or stops 84 can be positioned generally adjacent to the mounting element 81 to prevent its rotation upon threaded tightening engagement with a bolt or shaft 85.

The mounting element shape can be varied as desired, provided it functions to hold the support bracket 52 securely onto the uncoupling mechanism housing 63, such as by hooking action. Typically this is achieved by an outward-facing surface that is offset or stepped to define an indent in the lower portion of the mounting element 81. In the illustrated embodiment, the indent 77 is defined by a lower face that is inset with respect to the upper face 78 of the mounting element. Shaping of the edges can be varied. Considering the upper and lower edges for example, upper and bottom edges can be convex as shown or concave, examples including a convex upper edge and bottom edge and a convex upper edge with a concave bottom edge. The side edges can be straight as illustrated, with other shapes and angles (lateral and/or longitudinal) being possible.

When provided, the stop or stops 84 can temporarily rest upon the shelf 67 of the housing 63 during installation of the bracket to provide a convenient means for the installer to support the partially installed bracket, which can be of considerable weight when provided as a hardened casting. In addition, with stop or stops 84 resting on the shelf 67 after installation is complete, attachment security is enhanced for many embodiments.

Typically while the mounting element 81 is resting on the shelf 67 of the housing 63, the inwardly facing branch 76 of flange 73 is positioned for alignment with the coupler air brake hose support lug 82 and for securement, usually only partially completed at this stage of installation, of the flange 73 to the coupler lug 82. In the embodiment illustrated in FIG. 1, FIG. 2 and other drawings hereof, this securement can be by a simple nut and bolt arrangement wherein a bolt 86 is passed through the orifice of the coupler air brake hose support lug 82 and is secured in place by a nut 87. With the mounting element 81 firmly secured within the uncoupling mechanism housing 63 and the flange 73 firmly secured to the coupler air brake hose support lug 82, installation of the bracket 51 to the underside of the coupler 53 is complete. Fine tuning of this installation also is possible as noted herein.

It will be appreciated that this underside installation is to a portion of the coupler 53 that is beneath the coupler head 88, which head 88 typically includes a plurality of lightening holes 89 in the casting, primarily for the purpose of weight reduction. It is noted this results in installation that is easier, faster and more secure than prior art mounting products, including those that mount to the lightening holes 89. Such lightening hole mounted devices often require multiple steps and specially designed fasteners, for example wedge-shaped fasteners which are difficult to properly align, and installation usually requires from about 40 minutes to an hour or more. By contrast, bracket installation according to the present disclosure usually is completed in from 10 to 20 minutes. In addition, the underside assembly to the coupler significantly reduces susceptibility to damage due to bypassing couplers from adjacent railway cars. Prior art brackets that attach to the lightening holes 89, i.e. are side mounted, leave the bracket much more exposed than the underside mounting of the present disclosure. Coupler bypassing occurs when couplers on adjacent railway cars are angled laterally relative to each other so they do not couple as intended but instead contact each other on the sides. Since lightening hole mounted brackets are on the side, such bracket or brackets will contact each other (or the adjacent coupler), which can result in cracking, damaging or loosening of such side-mounted prior art couplers.

Further advantages of the brackets of the present disclosure include the following. Contact with the striker is avoided when the coupler is in the buff position, i.e. pushed all the way in, towards the striker; undesirable striker contact is an issue for prior art brackets such as coupler side-mounted brackets when installed on certain railway cars, resulting in cracked, damaged or loosened brackets and/or end-of-train devices. Generally, the present disclosure brackets fit on a wider variety of couplers than do side-mounted brackets. Also, when end-of-train devices are installed on a coupler, they are not installed onto the bracket of the present disclosure, but elsewhere on the coupler assembly in accordance with practice long followed in the art. Some prior art brackets mount end-of-train devices, which is not an issue for the present disclosure. Prior art brackets including ones that are not side mounted require supplemental mounting components, such as pins behind the coupler housing or welding during installation.

Figure 7:
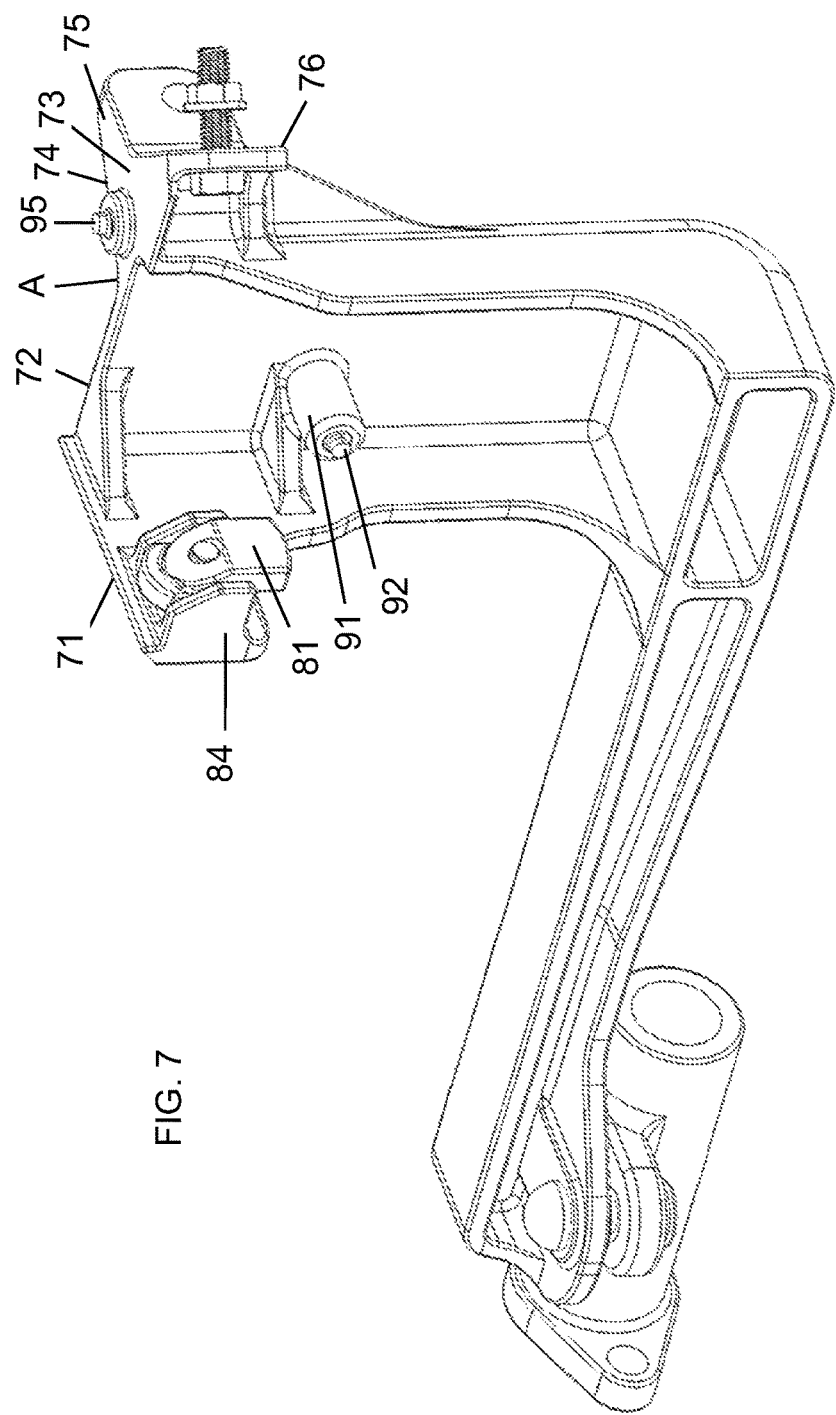
FIG. 7 is a perspective view of an alternate embodiment of a railway air brake hose support bracket.
Figure 8:
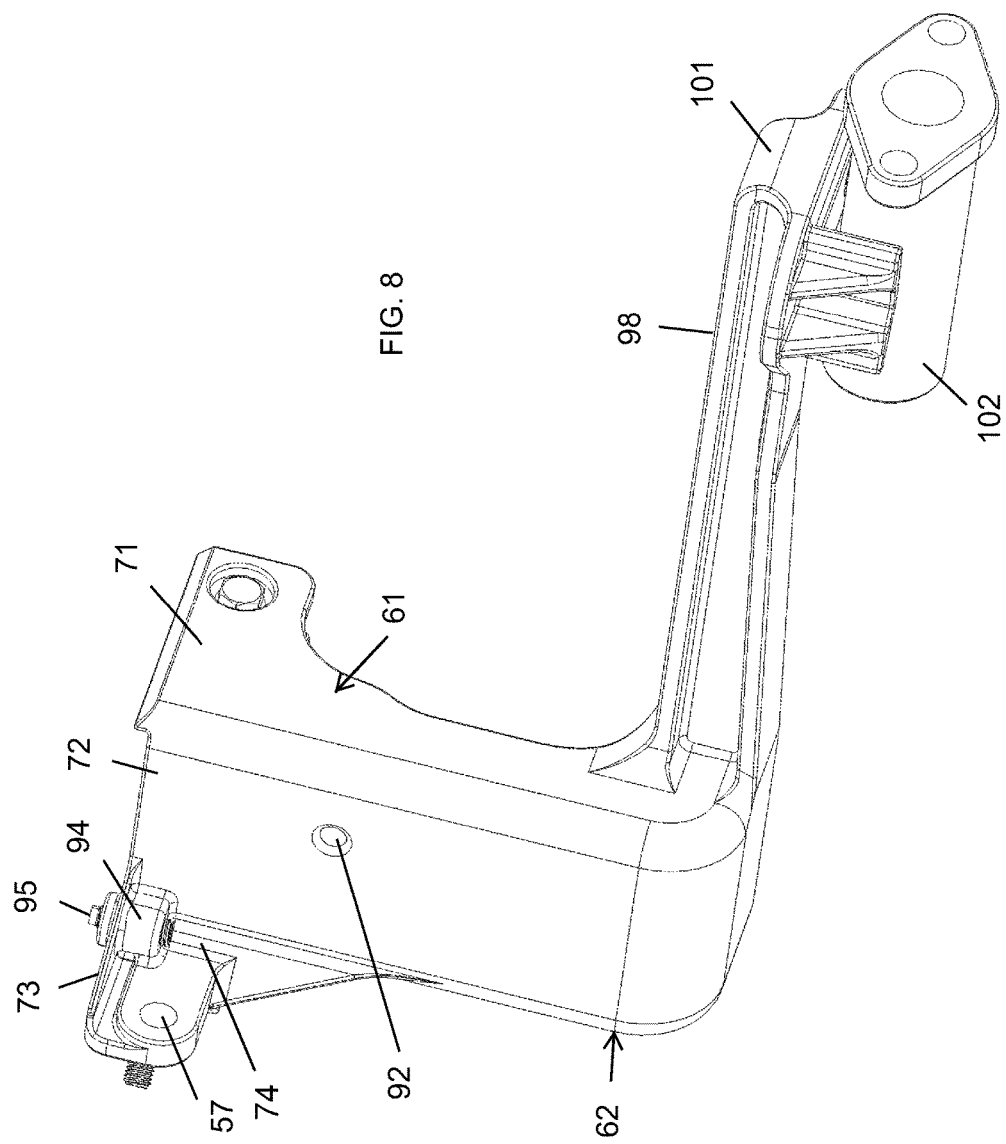
FIG. 8 is a perspective view of an embodiment generally in accordance with FIG. 7.
Figure 25:
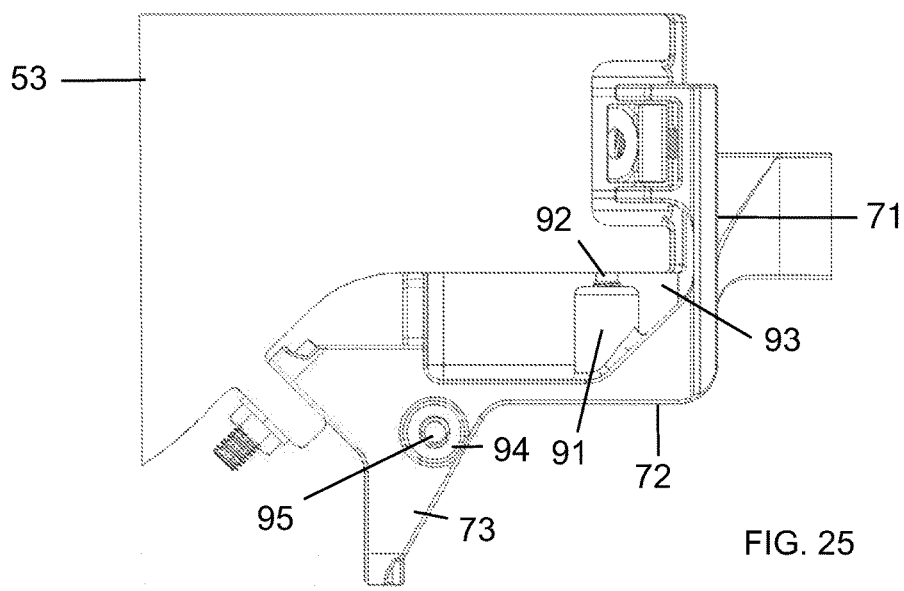
FIG. 25 is a detail plan view of the alternate embodiment depicted in FIG. 24.

FIG. 7 and FIG. 8, as well as other drawings discussed herein, show an alternate embodiment that includes added adjustment and setting features that are intended for facilitating assembly to a specific railway coupler. Those in the art appreciate that couplers, being relatively roughly cast and made by numerous different suppliers and at different factories, are not necessarily uniform in exact shape and size. The present disclosure recognizes this and offers the following. A boss 91 projecting inward on the inside of second wall 72 can contact the coupler sidewall adjacent to and defining a part of the coupler housing upper compartment 66 as an element of the wrap-around structure. In addition, a generally horizontally oriented setscrew 92 can be provided within the projecting boss 91 to allow for fine tuning to ensure contact with the sidewall of the coupler housing 63 that is opposite of the second wall 72 of the support bracket. This engagement is further illustrated, for example in FIG. 25, illustrating engagement between coupler underside housing sidewall 93 and an extended setscrew 92 in order to provide added stability after primary bracket installation has been completed.

Figure 24:
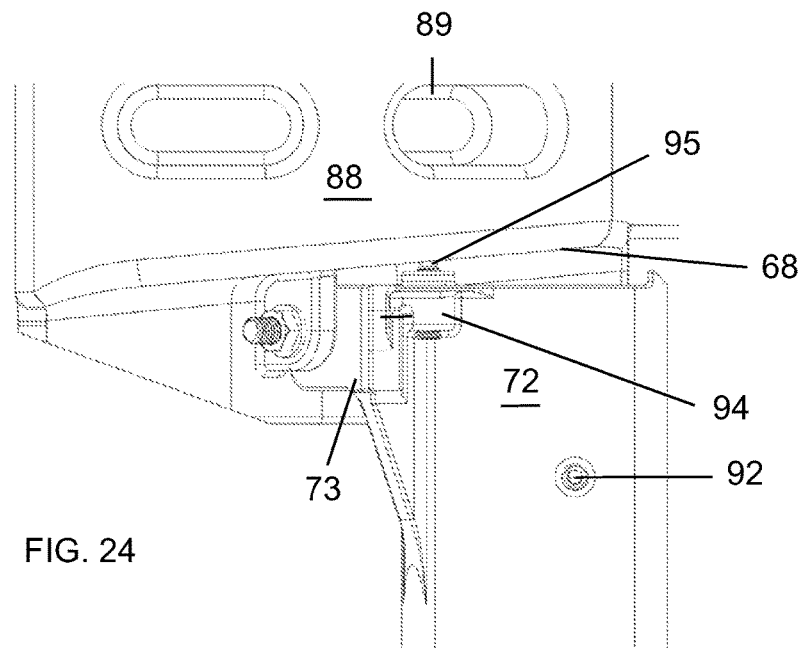
FIG. 24 is a detail elevation view illustrating alternate adjustment features in the interface between the wrap-around portion of the support bracket and coupler surfaces.

Another adjustment and fine-tune setting of the bracket upon completion of primary bracket installation has been completed is included in alternate embodiments. A mount 94 supporting a generally vertically oriented setscrew 95 is located in the vicinity of the second wall 72 and/or flange 73 in this alternate embodiment. When extended, the vertical setscrew 95 engages the coupler underside 68. FIG. 4 and FIG. 24 show this engagement between the coupler underside and the vertical setscrew 95 in order to provide added stability after primary bracket installation utilizing the mounting element 81 and the branch 76 of flange 73 for primary securement of the bracket in place.

FIG. 9, FIG. 10, FIG. 11, FIG. 12, FIG. 13, FIG. 14 and FIG. 15 provide structural details of another embodiment of the railway car air brake support bracket, including of the illustrated lower portion 62. First wall 71 has a beveled upper edge 96 in this embodiment, the illustrated bevel angle being about 45°, to reduce the likelihood of precipitation or condensation build-up which could reduce the life of the bracket.

The lower portion 62 includes an air hose connector 102 grasped at a location spaced laterally (i.e. generally horizontally when installed to a coupler) and rearward of the coupler. In this embodiment, this lateral spacing is achieved by a generally L-shaped bracket having (as installed) a generally vertical portion or leg 97 and a generally horizontal portion or leg 98, with a grasping feature, generally designated at 99, at or near a remote portion or free end portion 101 of leg 98. This railway car air hose support bracket includes an air hose connector 102 securely engaged to the lower bracket portion (specifically the leg 98 in this embodiment) at a location that allows clearance of hose assembly components with respect to the underside 103 of the bracket; thus, the portion of the air hose connector 102 of the support bracket that needs to connect to air hose components (usually at either end of the air hose connector) is positioned to be downwardly oriented with respect to the air hose support bracket at the location of the air hose connector 102 to minimize risk of obstruction by the bracket of proper positioning of the air hose assembly when the railway car is at rest or in operation.

The secure engagement of the air hose connector 102 to the leg 98 in the railway car air hose support bracket of this illustrated embodiment allows for rotational movement of the air hose connector 102 within a generally horizontal plane (as installed). This rotational movement accommodates normal movement of the air brake hose assembly during operation, installation and/or maintenance of the railway car. In this embodiment, the movement within a generally horizontal plane is accomplished by rotation along a generally vertical axis along a generally vertical shaft 104, which also serves as a component of the secure engagement between connector 102 and leg 98. Other structures for allowing movement of the air hose connector 102 within a generally horizontal plane are contemplated including more complex structures that can allow generally full rotation during installation and that are modified to limit the extent of rotation upon completion of installation and prior to use.

The particular shaft 104 of this illustrated embodiment takes the form of a rivet wherein at least one of the rivet heads 105, 106 is formed after assembly to maintain secure engagement and assembly of these bracket components even when subjected to extended vibration, forces and shocks during extended life use. This secure engagement maintenance is primarily due to providing a non-detachable connection such as this illustrated rivet assembly that is not susceptible to disengagement or failure during normal railway use. Although a non-detachable connection is advantageous, it is within the scope of this disclosure to provide secure engagement by structures other than rivet assemblies. Included in this regard are nut and bolt assemblies, U-bolt assemblies, studs projecting from one of the leg 98 or connector 102 (which studs can be threaded for bolt or other securement member or can be secured by rivet action). When threaded options are practiced, added security can include chisel checking of threads, spot welding and other securement means. Other options can include use of a clevis pin and/or a cotter pin.

A further element, or further elements, of the support bracket associated with securely grasping the air hose connector in many embodiments provides a limitation on movement of the bracket air hose connector 102, including allowed rotational movement within a generally horizontal plane as described herein. A typical movement limiter takes the form of one or more stop members, shown at 107 in this embodiment, which may be permanent, removable, or capable of allowing a greater degree of horizontal-plane rotation in one mode and limited rotation in another mode. Various embodiments in this regard are discussed herein.

Figure 18:
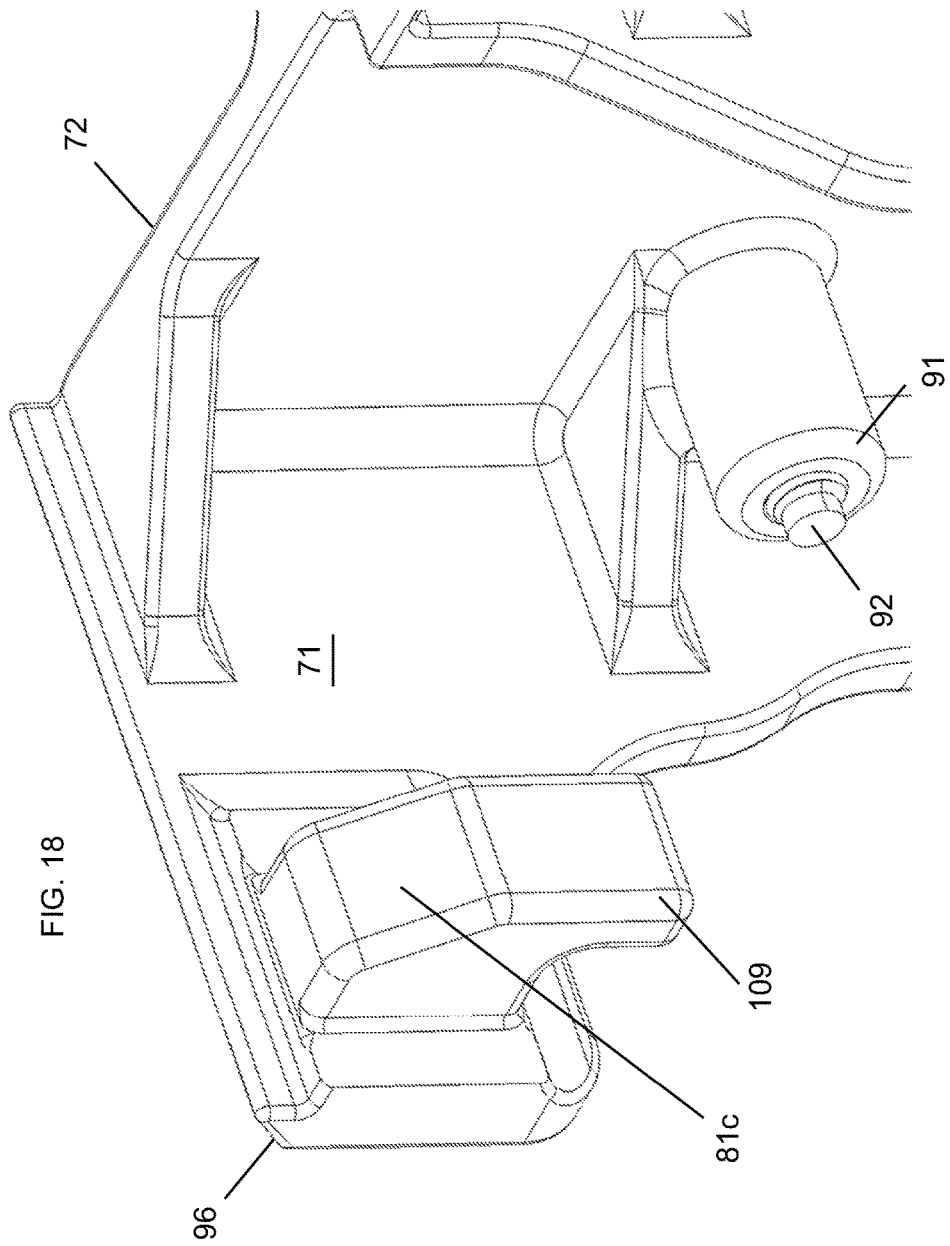
FIG. 18 is a perspective view of another embodiment at the upper portion of a support bracket.

Returning to a discussion of the upper portion 61, FIG. 16, FIG. 17 and FIG. 18 depict examples of alternate embodiments for the mounting element and stop features disclosed herein in wrapped-around connection with the upper portion of the air brake hose support bracket, particularly the components of the first wall 71 and that enter the upper compartment 66 of the uncoupling mechanism housing of the railway coupler. FIG. 16 shows a movable mounting element 81a that is internally threaded onto a threaded shaft 108. As shaft 108 rotates in tightening or loosening fashion, the movable mounting element 81a will tend to rotate with the shaft 108, which rotation will be substantially eliminated or adequately limited by positioning of stop 84a without requiring engagement of a tool with the movable mounting element 81a. FIG. 17 shows a similar assembly, with rotation of the movable mounting element 81b being limited by stop 84b upon rotation of the shaft 108, without requiring engagement between mounting element 81b and a tool.

FIG. 18 depicts a non-movable mounting element 81c in place of a movable mounting element and a stop or stops. This non-movable mounting element 81c takes the form of a rigid hook that grasps the upper compartment 66 of the underside of the railway car coupler. More particularly, the non-movable mounting element or hook 81c slides onto the shelf 67 of the coupler and its leading, indented portion 109 enters into the shelf opening 69, thereby "hooking" the wall 71 of the upper wrap-around portion onto the coupler underside housing.

Alternate embodiments of structures for securement of the railway car air brake hose support bracket to the air brake hose support lug 82 of the railway car coupler are illustrated in FIG. 19, FIG. 20, FIG. 21, FIG. 22, FIG. 23 and FIG. 24, each embodiment essentially substituting for the bolt 86 and nut 87 of other embodiments. It will be appreciated that the orientation of the bolt 86 and nut 87 with respect to the existing air brake hose support lug 82 can be reversed such that the nut 87 is internal of the lug 82, or the nut 87 can be replaced with a threaded opening of the inward facing branch 76. Also, the spacing can be such that the leg portion of the inward facing branch 76 that engages the lug 82 is on either side of the lug.

Figure 19:
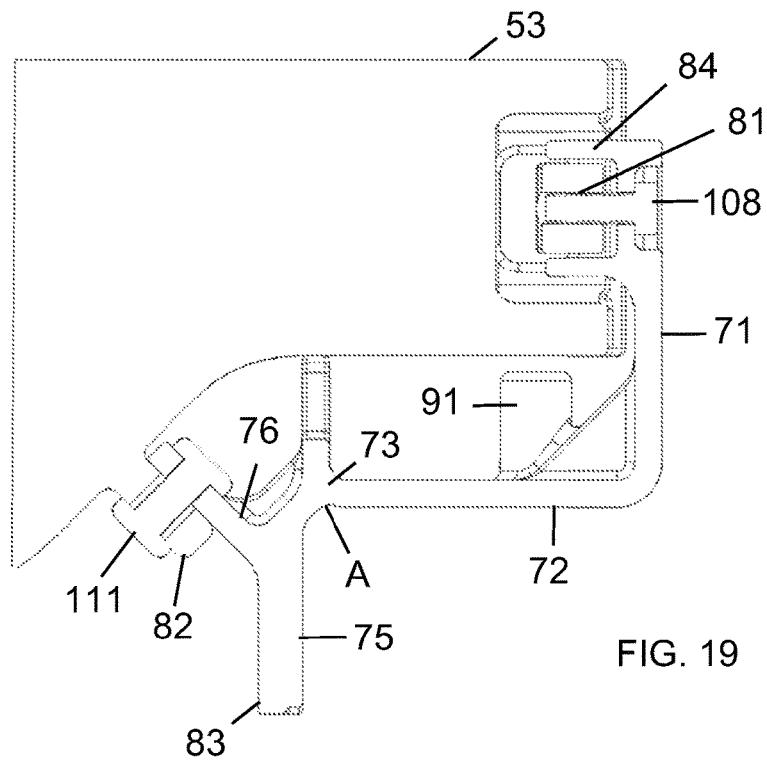
FIG. 19 is a top plan view of an added embodiment of the support bracket, shown attached to a railway car coupler in a somewhat schematic view.
Figure 20:
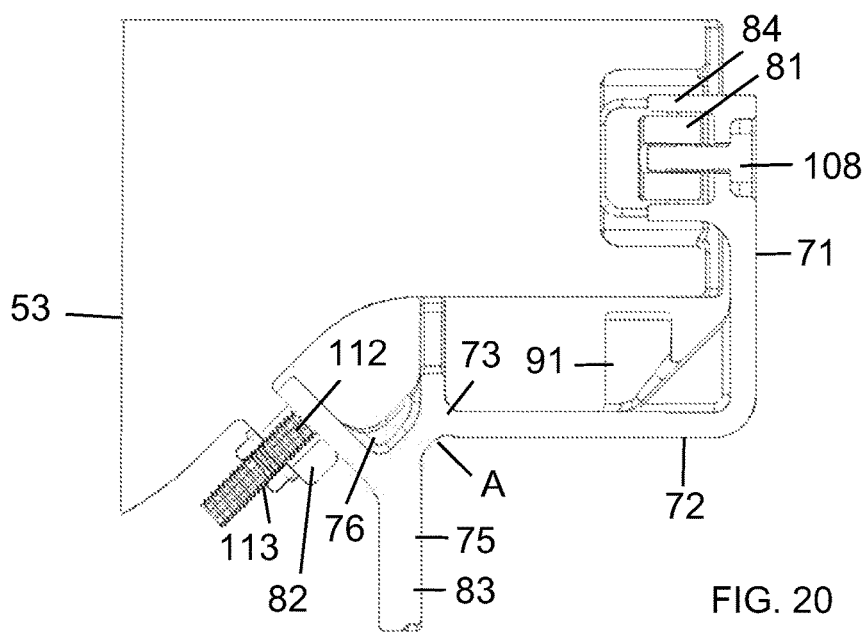
FIG. 20 is a top plan view of a further embodiment of the support bracket, shown attached to a railway car coupler in a somewhat schematic view.
Figure 21:
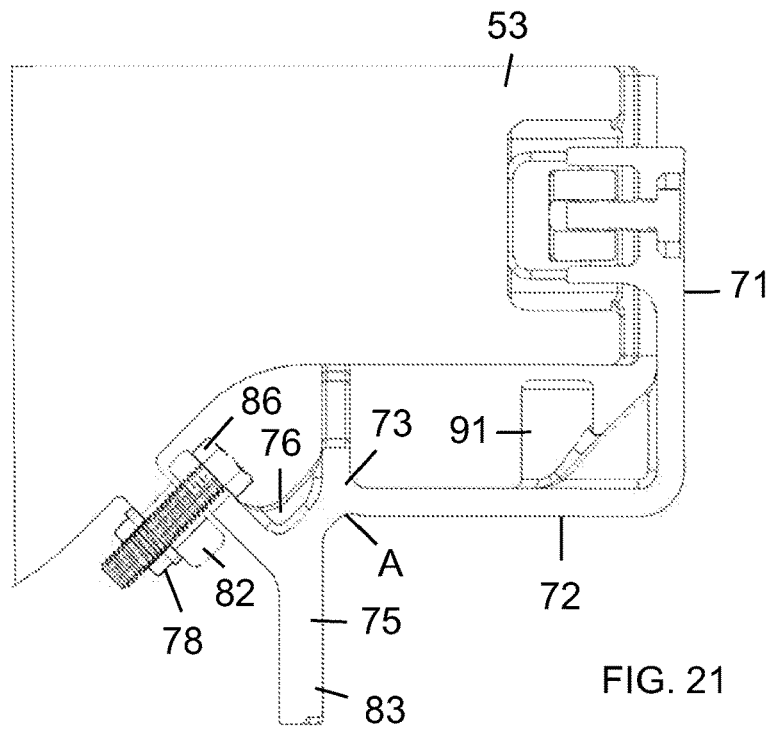
FIG. 21 is a top plan view of an additional embodiment of the support bracket, shown attached to a railway car coupler in a somewhat schematic view.
Figure 22:
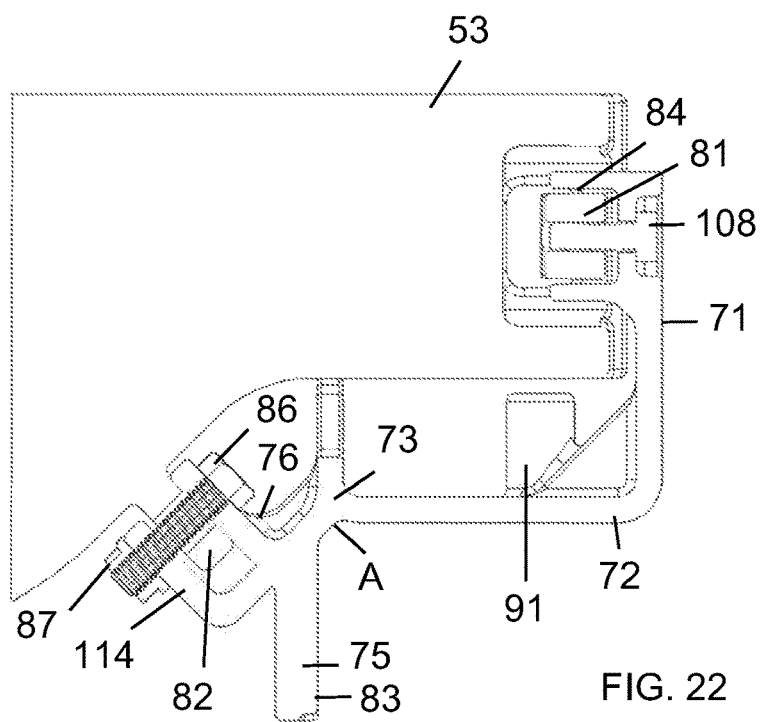
FIG. 22 is a top plan view of an added embodiment of the support bracket, shown attached to a railway car coupler in a somewhat schematic view.
Figure 23:
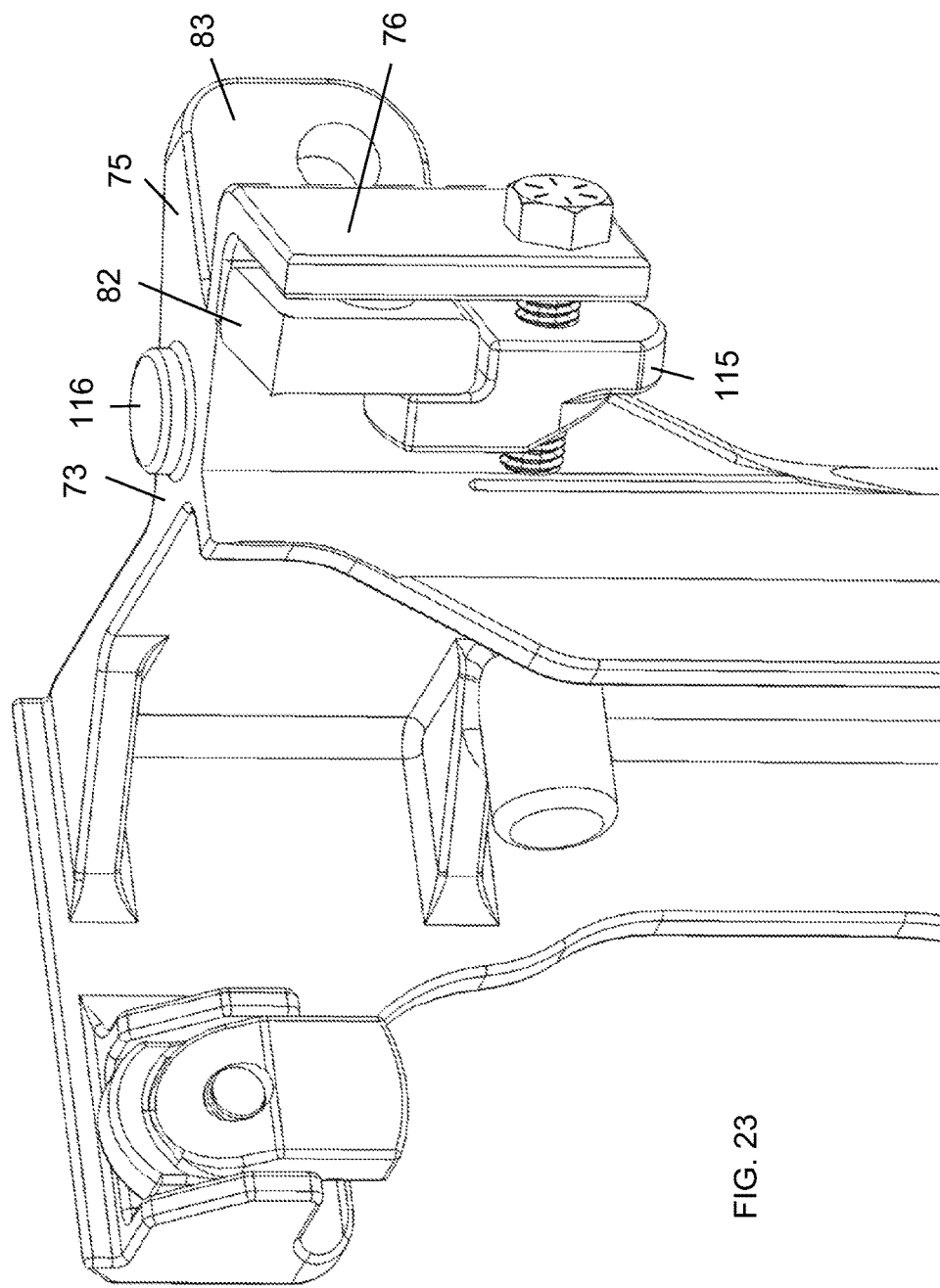
FIG. 23 is a perspective view a further embodiment of the support bracket, shown attached to a railway car coupler that is illustrated in a somewhat schematic manner.

FIG. 19 incorporates a permanent connection such as a rivet or a Huck® blind rivet or lock bolt to non-detachably connect branch 76 of the support bracket flange 73 to the existing coupler air brake hose support lug 82. FIG. 20 incorporates a permanent connector component, namely a shaft 112 manufactured integrally with or permanently attached to branch 76 of the support bracket flange 73, which shaft 112 includes a connector feature such as threads that accept complementary features such as threads of a connector 113. The shaft 112 passes through the coupler air brake hose support lug 82 and assembly is carried out by applying the connector 113 to the shaft 112. FIG. 21 incorporates the bolt 86 and nut 87, and FIG. 21 illustrates that, due to manufacturing tolerances in the coupler and/or the support bracket, the support lug 82 and branch 76 of the support bracket flange 73 need not contact each other, as shown in other figures of this disclosure. FIG. 22 shows a clevis-type arrangement where the branch 76 is combined with a leg 114 as shown, with the bolt 86 passing through holes in each of the branch 76, lug 82 and leg 114. FIG. 23 illustrates an embodiment in which the hole in the coupler's existing air brake hose support lug 82 is not a component of the attachment function; instead, a clamp 115 engages the lug 82 between the clamp 115 and the branch 76 of the support bracket flange 73, which clamp is secured in place by suitable connecting means such as those illustrated herein in this and other figures.

Figure 26:
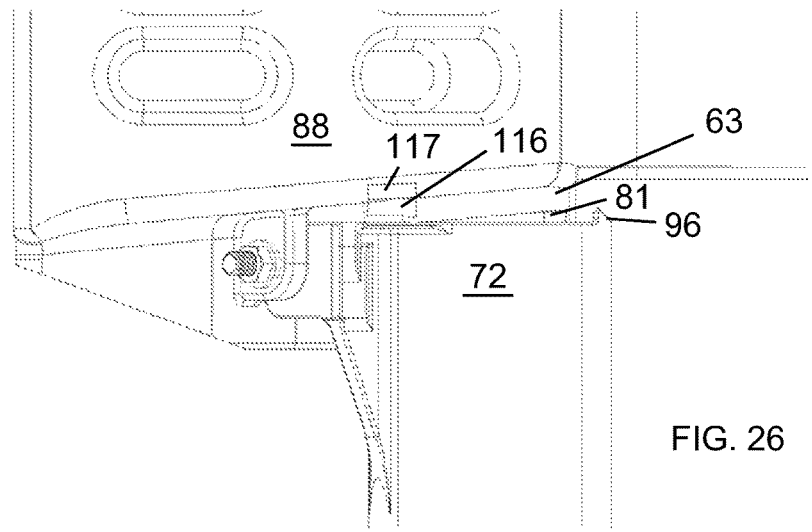
FIG. 26 is a detail elevation view illustrating a further alternate adjustment features in the interface between the wrap-around portion of the support bracket and coupler surfaces.
Figure 27:
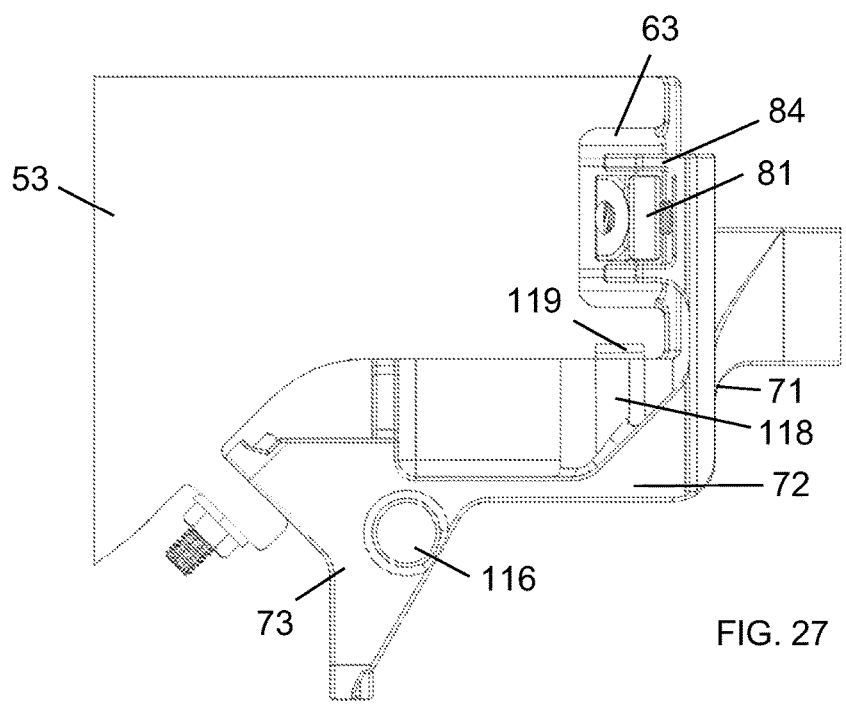
FIG. 27 is a detail plan view of the alternate embodiment depicted in FIG. 26.

The possibility of undesirable bracket rotation is addressed by stop arrangements in some embodiments, such as illustrated in FIG. 24 and FIG. 25 as previously discussed. FIG. 26 shows a generally vertically (as installed) oriented protrusion 116 at a location along the top surface of the support bracket, this embodiment showing vertical protrusion 116 extending above the subsidiary wall 74 of the support bracket flange 73 (illustrated as a projecting member in this embodiment) of the support bracket. In this embodiment, vertical protrusion 116 is cast with a height greater than expected to be needed in order to address possible variations in the gap at this location due to allowable tolerances of couplers and support brackets. Then, during installation, a section (illustrated at 117) of this vertical excess-height protrusion 116 can be removed to accommodate the particular coupler onto which the support bracket is being installed. FIG. 27 shows a generally horizontally (as installed) oriented excess-length protrusion 118 which, during installation, has a section (illustrated at 119) that can be removed to accommodate the particular coupler onto which the support bracket is being installed.

Figure 28:
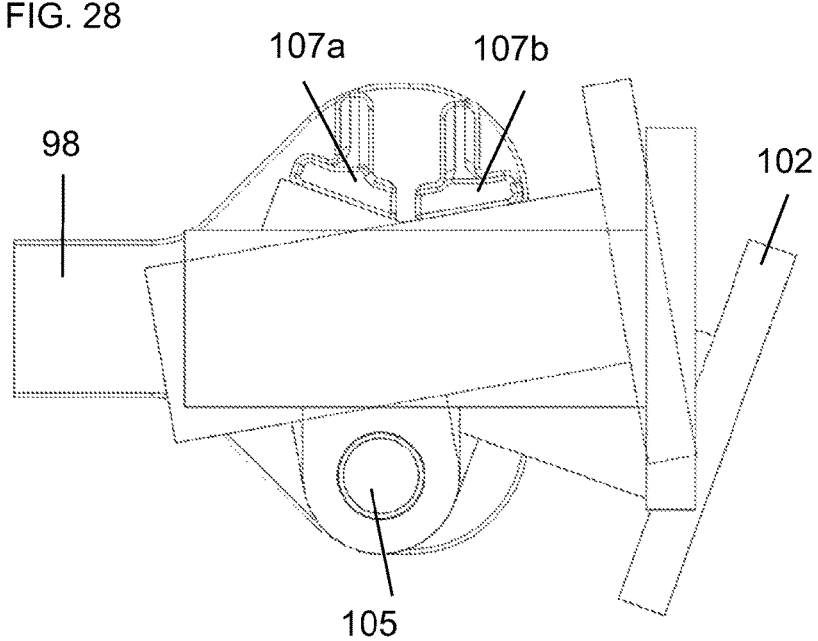
FIG. 28 is a bottom plan view concerning an air hose connector grasping arrangement with an first alternate embodiment allowing limited movement of the air hose connector.
Figure 29:
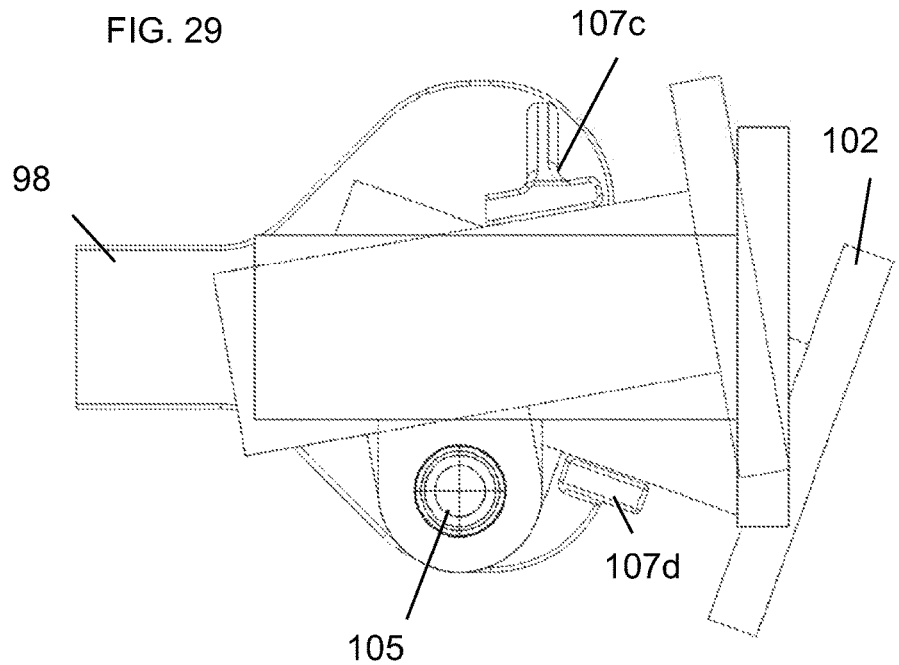
FIG. 29 is a bottom plan view concerning an air hose connector grasping arrangement with a second alternate embodiment allowing limited movement of the air hose connector.
Figure 30:
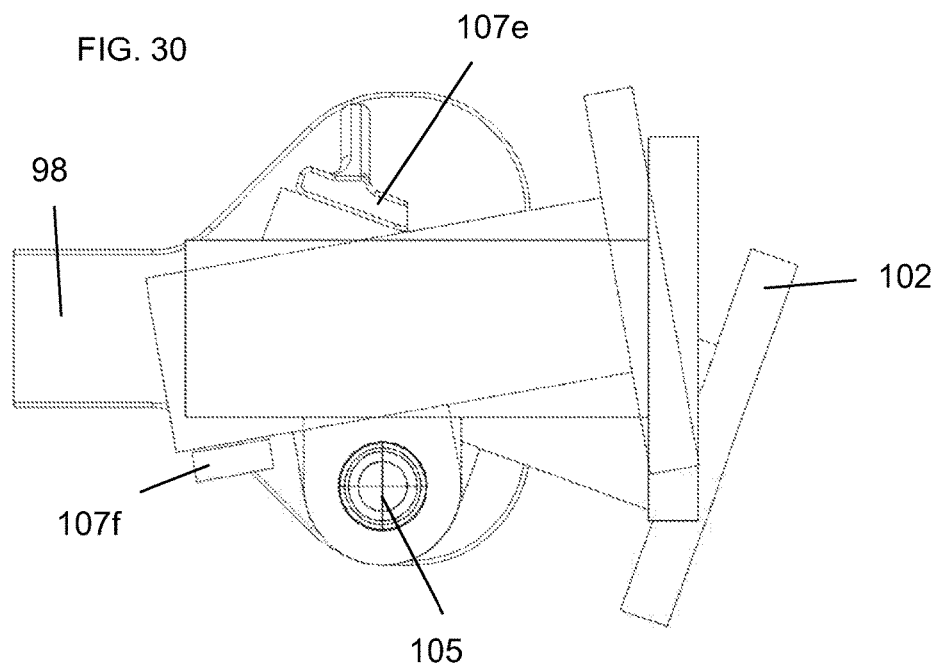
FIG. 30 is a bottom plan view concerning an air hose connector grasping arrangement with a third alternate embodiment allowing limited movement of the air hose connector.
Figure 31:
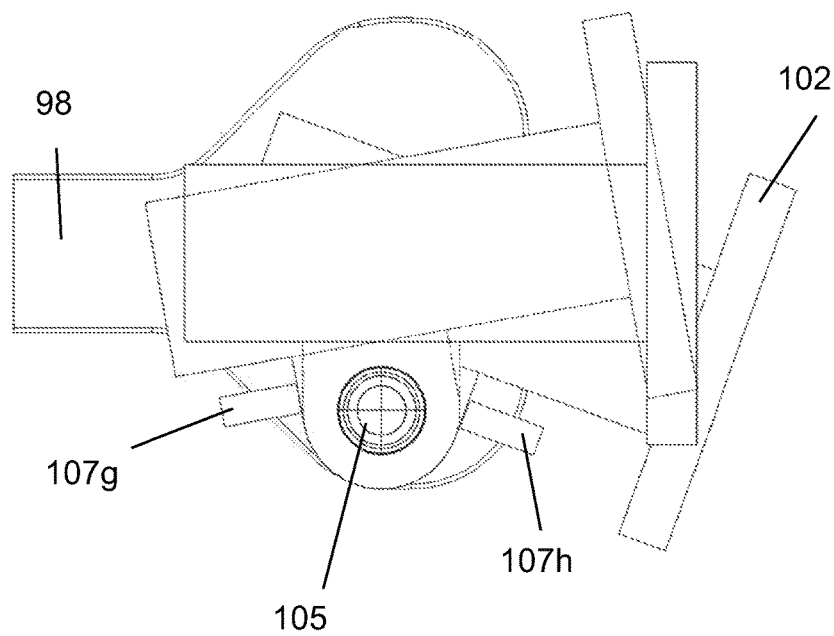
FIG. 31 is a bottom plan view concerning an air hose connector grasping arrangement with a fourth alternate embodiment allowing limited movement of the air hose connector.
Figure 32:
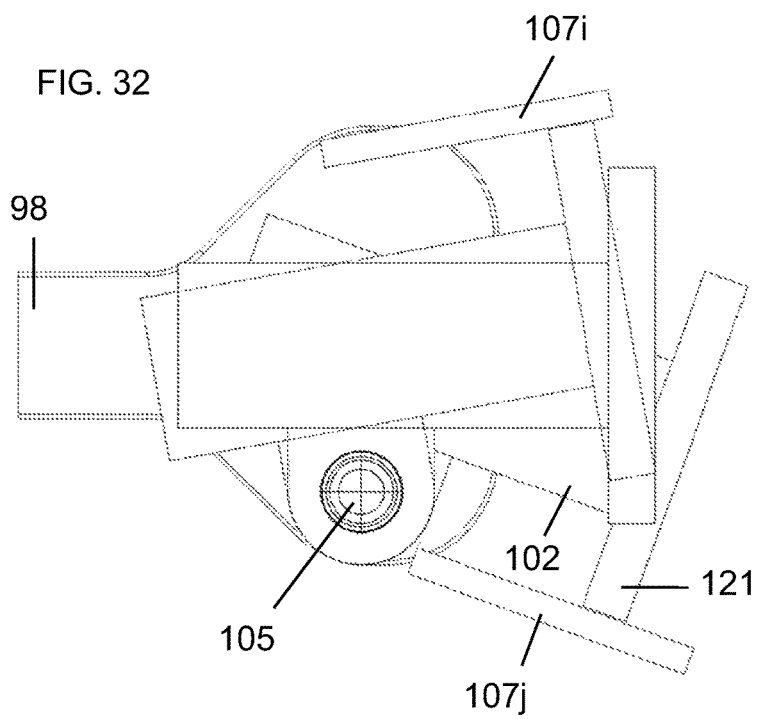
FIG. 32 is a bottom plan view concerning an air hose connector grasping arrangement of a fifth alternate embodiment allowing limited movement of the air hose connector.

FIG. 28, FIG. 29, FIG. 30, FIG. 31, FIG. 32 and FIG. 33 are illustrative of embodiments varying the means by which rotation of the support bracket's air hose connector 102 is limited. Same-side split stop members 107a and 107b are shown in FIG. 28. Opposing-side stop members 107c and 107d are shown in FIG. 29 positioned on the free-end side of the bracket. Opposing-side stop members 107e and 107f are shown in FIG. 30 positioned on the aft side spaced from the free-end of the bracket. FIG. 31 shows same-side stop members 107g and 107h that engage the arm of the air hose connector 102, while FIG. 32 shows stops 107i and 107j that engage a flange 121 of the air hose connector 102.

Figure 33:
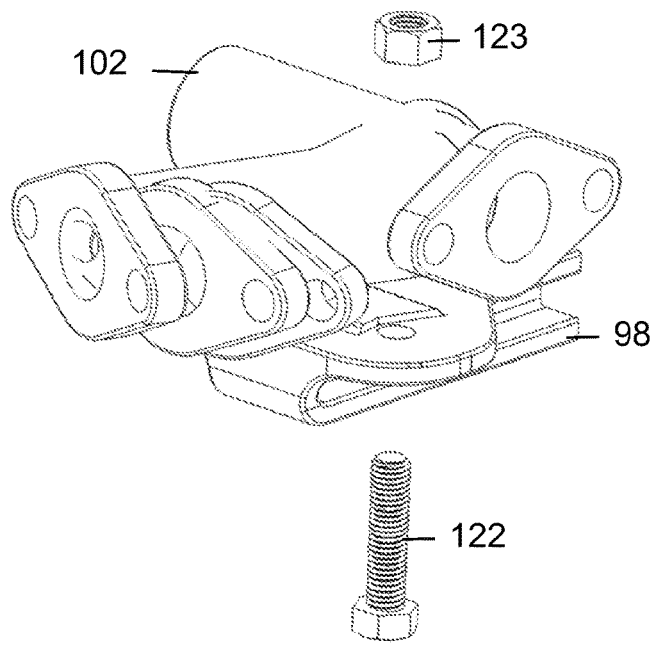
FIG. 33 is a perspective view concerning an air hose connector grasping arrangement with a sixth alternate embodiment allowing limited movement of the air hose connector.

In the embodiment illustrated in FIG. 33, a removable stop arrangement is provided in order to allow greater range of motion of the air hose connector 102 within the generally horizontal plane during installation. For example, the air hose connector can be allowed to rotate a full 360° when the hose assembly components are attached to the air hose connector 102, such as allowing positioning of the connector at 90° with respect to the horizontal leg 98 of the illustrated support bracket in order to provide greater wrench clearances in order to facilitate installation of the hose assembly components to the air hose connector 102. In this embodiment, the removable stop arrangement takes the form of a simple bolt 122 secured in place by a nut 123. It will be appreciated that other removable and reinsertable members could be used.

Figure 34:
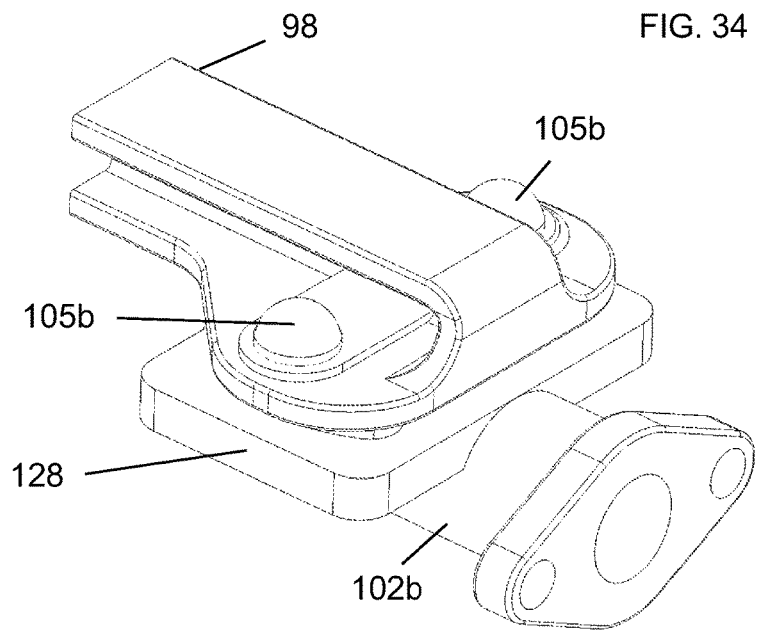
FIG. 34 is a perspective view concerning an air hose connector grasping arrangement with a seventh alternate embodiment allowing limited movement of the air hose connector.
Figure 34A:
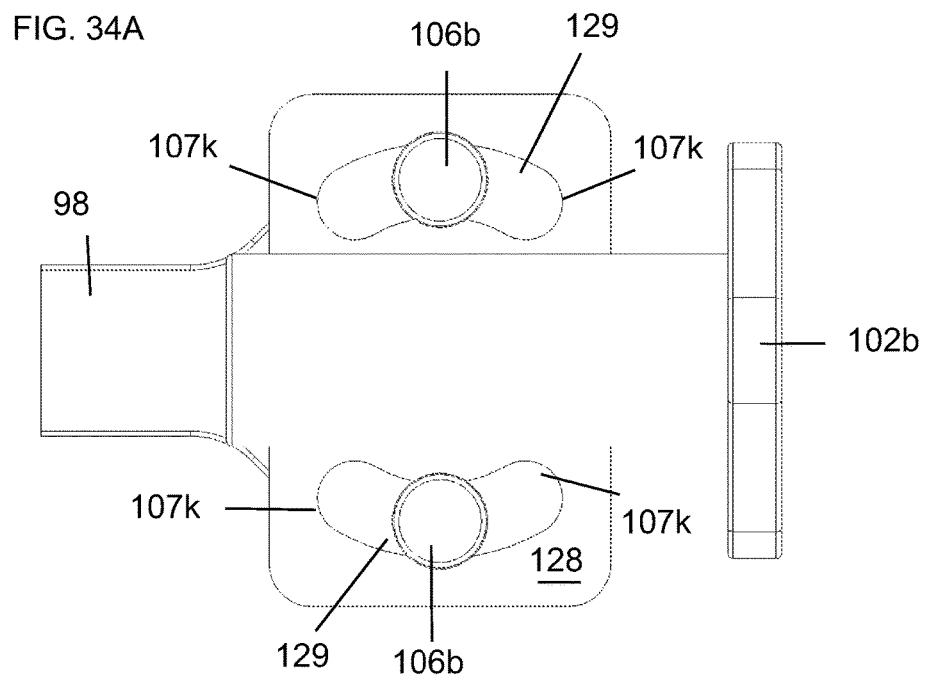
FIG. 34A is a bottom plan view of the embodiment of FIG. 34.
Figure 34B:
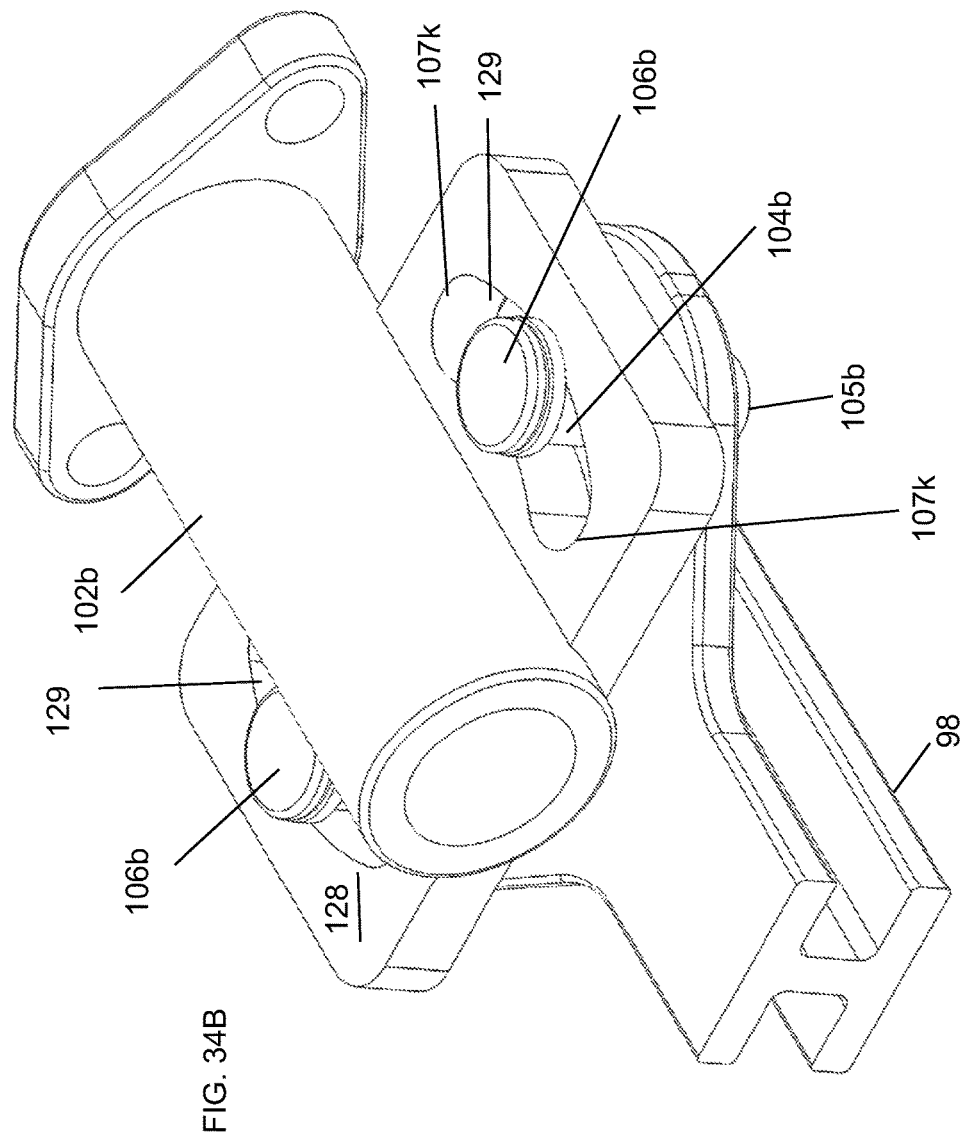
FIG. 34B is a perspective view from the bottom of the embodiment of FIG. 34.

Rotational movement of the air hose connector using two shafts that are spaced from and generally flank the axis of rotation is illustrated in FIG. 34, FIG. 34A and FIG. 34B. An air hose connector 102b includes a platform 128 having a pair of slots 129 sized and shaped to accommodate respective movement of a pair of shafts 104b which have a stop 107k at each end of each slot 129. The shafts 104b connect the air hose connector 102b to the leg 98. In this illustrated embodiment, each shaft is a rivet secured in place within the slots by its rivet heads 104b and 105b.

Figure 35:
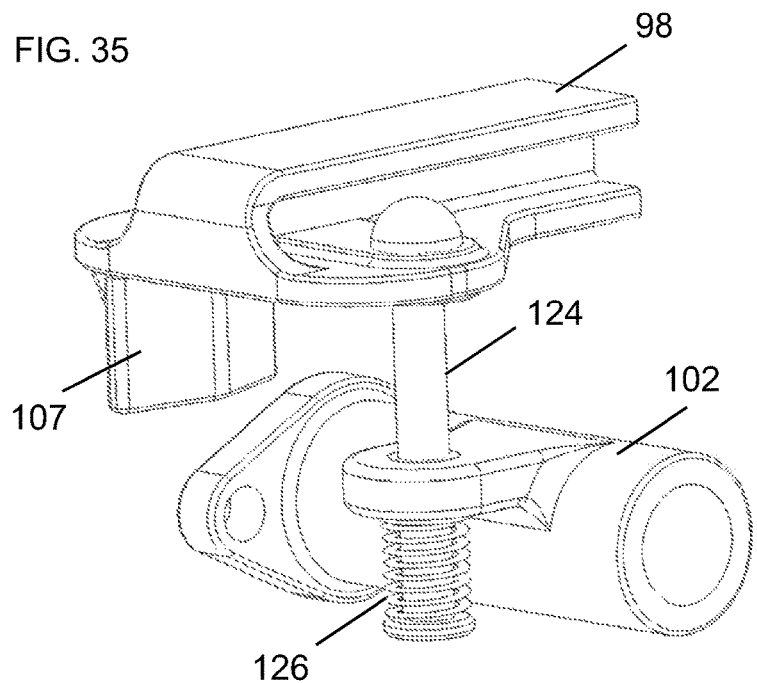
FIG. 35 is a perspective view concerning an air hose connector grasping arrangement with a seventh alternate embodiment allowing limited movement of the air hose connector, shown in a moved-away mode.
Figure 35A:
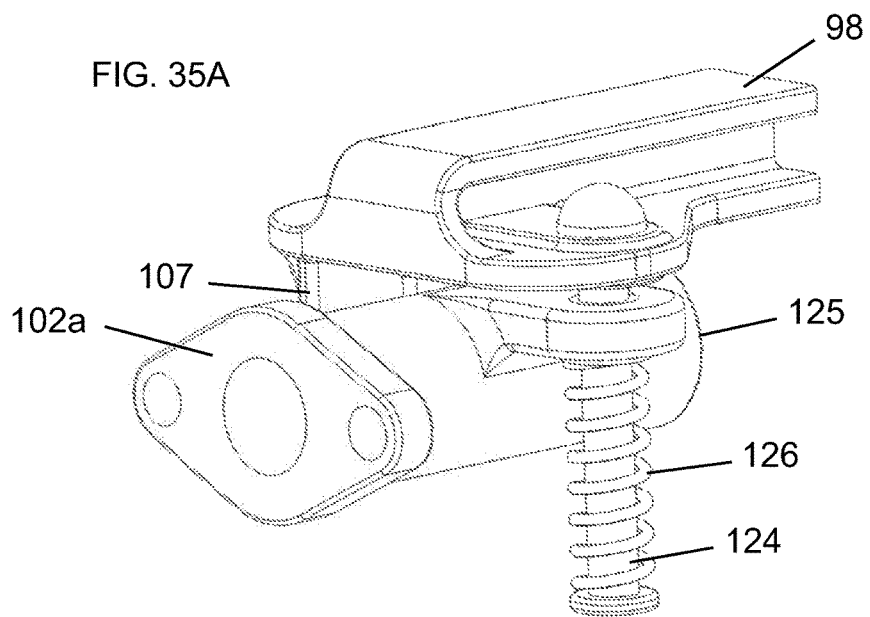
FIG. 35A is a perspective view of the embodiment of FIG. 35, shown in a closed mode.
Figure 36:
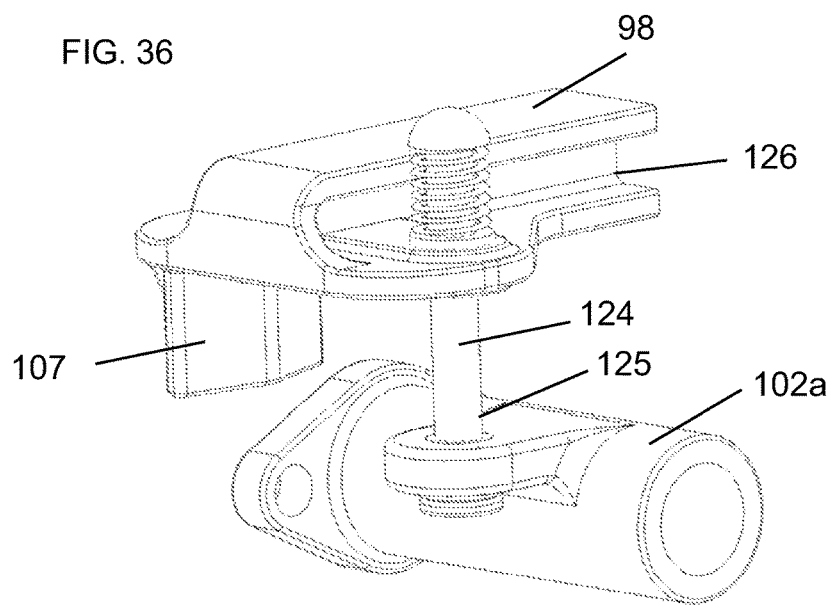
FIG. 36 is a perspective view concerning an air hose connector grasping arrangement with an eighth alternate embodiment allowing limited movement of the air hose connector, shown in a moved-away mode.

FIG. 35 shows a further embodiment to facilitate installation of hose assembly components to the air hose connector. Rather than a removable stop arrangement as in FIG. 33, the air hose connector is mounted while allowing a range of movement within the generally horizontal plane that avoids the stop 107. In the illustrated version, an elongated member 124 is slidably mounted to the air hose connector 102a through suitable means such as the illustrated flange hole 125. If desired, while installing hose assembly components to the connector 102a, the connector is moved along the elongated member 124 and rotated as desired, such as at 90° with respect to the length of the leg 98 in order to provide greater wrench clearances during assembly and installation. A biasing member 126 ensures the air hose connector 102a returns to its in-use orientation as shown in FIG. 35A. A similar embodiment is shown in FIG. 36, where the biasing member 126 is above (as installed) the support bracket leg 98, rather than below same as in FIG. 35. In either embodiment, the elongated member can take the form of a rivet as illustrated.

Figure 37:
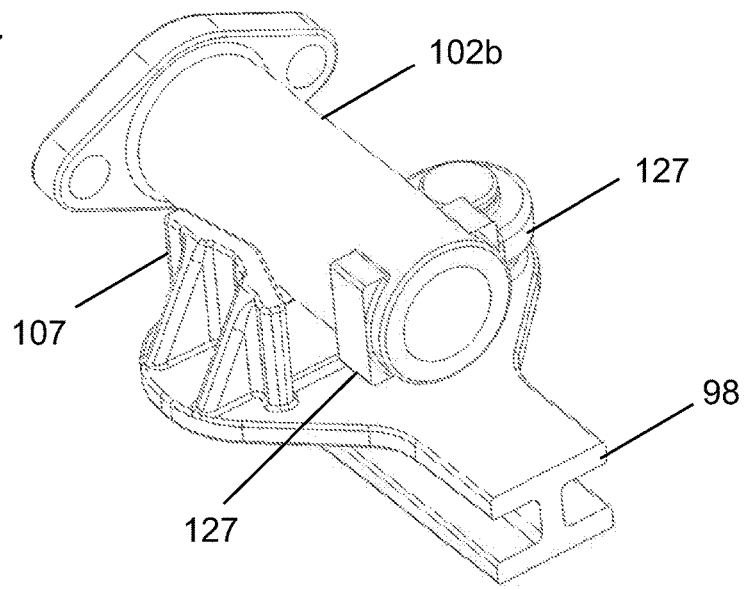
FIG. 37 is a perspective view of an alternate embodiment of an air hose connector including wrench-accommodating flats.

Another embodiment that facilitates installation is depicted in FIG. 37. Here, a modified bracket component is an air hose connector 102b that includes one or more flats 127 added to its body. Such flats can be useful during installation of hose assembly components in that they accommodate a wrench for securing the air hose connector 102b to eliminate stress that would otherwise be transferred to the bracket assembly, such as to the pin 104 by which the air hose connector 102b is permanently secured to the rest of the support bracket, typically at leg 98.

Figure 38:
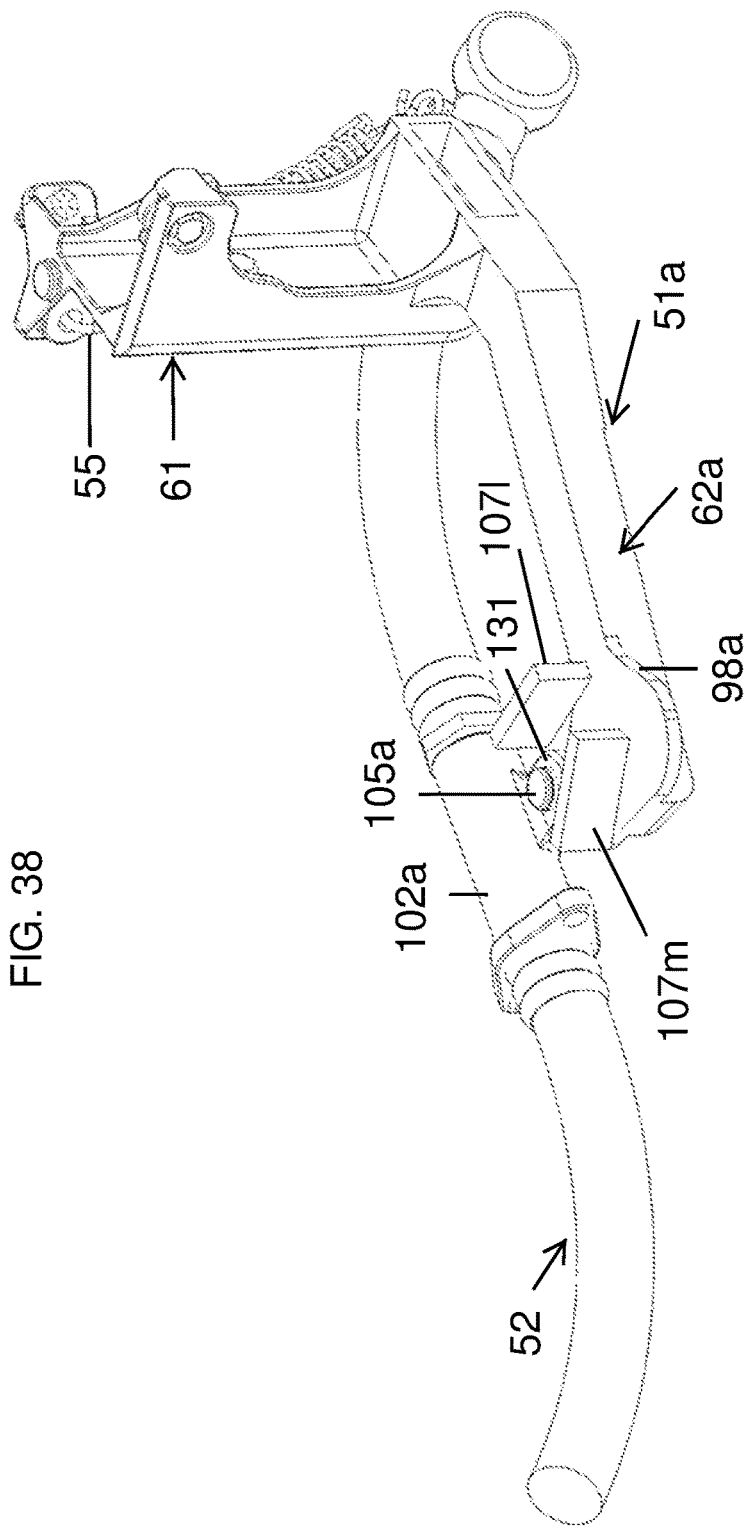
FIG. 38 is a perspective view of an additional alternate embodiment by which the air hose assembly is mount alongside the lower portion of the air hose support bracket.

The embodiment of FIG. 38 and FIG. 38A illustrates mounting of the air hose assembly 52 at a location alongside the lower portion of this embodiment of the air hose support bracket 51a In this embodiment, the grasping feature is laterally oriented as installed. The horizontal leg 98a of the lower portion 62a mounts the air hose connector 102a of this bracket embodiment above and to the side of the horizontal leg which has a side boss 131 mounted above the horizontal leg 98a and to an upstanding shaft such as one having the illustrated rivet head 105a. The shaft extends from a side of a widened portion of the horizontal leg 98a, allowing rotation of the air hose connector 102a and thus of the air hose assembly. In this embodiment, limitations are placed on this rotation (in a horizontal plane as installed) by including one or more stop members 107l, 107m that engage the air hose connector thereby limiting the extent of its movement.

Figure 39:
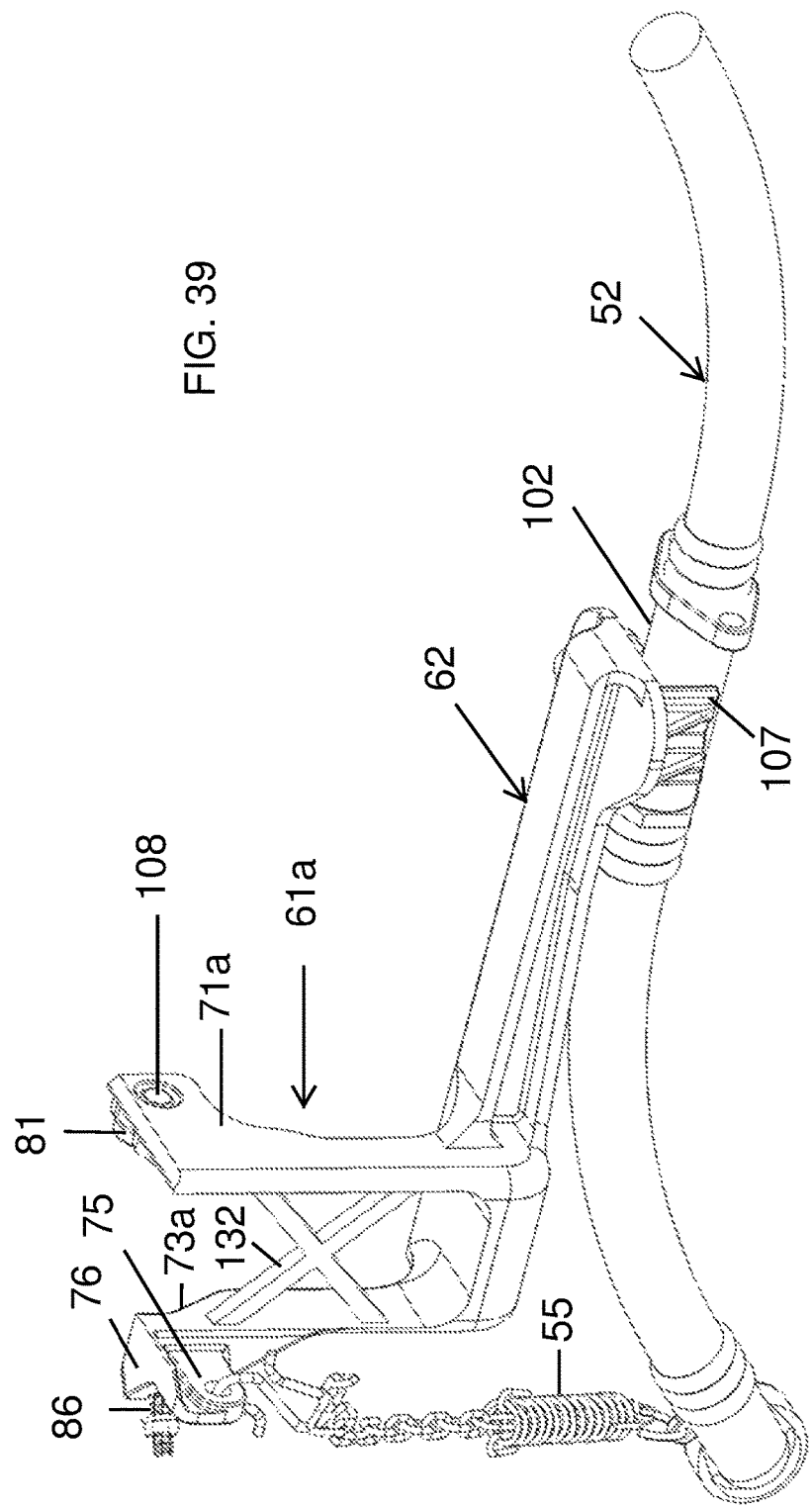
FIG. 39 is a perspective view of a railway air brake hose support bracket for connection to a railway car coupler in an indirect wrap-around manner, including to an uncoupling mechanism housing on the underside of the coupler, and from which a brake hose assembly is suspended.

FIG. 39 is an embodiment of a railway car air hose support bracket that can be considered to illustrate an indirect wrap-around arrangement where the coupler components that are engaged by the bracket are much more exposed than according to a more direct wrap-around arrangement such that illustrated in FIGS. 1 and 2. In FIG. 39, the first wall 71a does not connect to a second wall having the projecting flange 73a; instead, the projecting flange 73a is free-standing wall without requiring the more sizeable element of a solid second wall joining the flange 73a directly to the first wall 71a. Thus, both first wall 71a and projecting flange 73a are independently upstanding from the lower portion 62, thereby forming the upper portion 61a. When desired, the second wall can be substituted for by one or more support structures 132, such as the illustrated "X" bracket positioned between walls 71a and 73a. When a support structure 132 in included, it should be shaped, sized and positioned to not interfere with the ability of the mounting element 81 to securely engage the upper compartment 66 of the coupler housing or with the ability of the inward facing branch 76 of the flange 73a to securely engage the air brake support lug 82 of the coupler underside area.

In use, typically the first attachment member of the bracket is first inserted into the upper compartment of the lock lifter uncoupling mechanism housing, thereby supporting the bracket by resting on a component associated with the upper compartment. Then, an attaching member such as a bolt is inserted through the second attachment member and the air brake hose support lug of the coupler, the nut or the like is affixed and the attaching members are tightened. The securement arrangement for the first attachment member is tightened. The air hose assembly component or components are attached to the air hose connector. When a rotatable air hose connector is used, and when a stop avoidance approach is included, fuller rotation can be used to facilitate air hose assembly component attachment.

It is also possible to proceed with air hose assembly component attachment prior to installation of the bracket onto the railway car coupler. This can provide even further assistance in such assembly activity. Then the bracket with air hose assembly attached is installed as generally noted herein. In an embodiment where the air hose connector is readily separable from the lower portion of the bracket, a further method is to join the air hose connector to the air hose assembly component or components and then detachably connect the air hose connector to the lower portion of the bracket, such as by a detachable structure rather than a rivet structure, for example using nut and bolt assemblies, U-bolt assemblies, studs projecting from one of the leg or the air hose connector.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A railway car air brake hose support bracket adapted to suspend a railway air brake hose assembly from a railway car coupler, the air brake hose support bracket comprising:
   a lower portion that has a grasping feature inward of the railway car with respect to the coupler;
   an upper portion that is upstanding with respect to the lower portion of the bracket;
   the upper portion has a first attachment member that connects to a coupler housing beneath a railway car coupler head and a second attachment member that connects to an air brake hose support lug of the railway car coupler, the first attachment member and the second attachment member being laterally spaced from and positioned with respect to each other into a wrap-around configuration;
   the wrap-around configuration substantially aligns the first attachment member with the compartment of the coupler housing and substantially aligns the second attachment member with the air brake hose support lug; and
   an air hose connector that is adapted and structured to engage with an air brake hose assembly, the grasping feature securely engaging the air hose connector to the lower portion, whereby the air brake hose support bracket suspends the air brake hose assembly from the railway car coupler.

2. The air brake hose support bracket of claim 1, wherein the first attachment member projects inward with respect to the railway car coupler and enters into a compartment of the coupler housing.

3. The air brake hose support bracket of claim 1, wherein the first and second attachment members, when connected to the railway car coupler, are both beneath the railway car coupler head.

4. The air brake hose support bracket of claim 1, wherein the wrap-around configuration includes a first wall generally perpendicular to a second wall, the first attachment member being at the first wall, and the second attachment member being supported by the second wall.

5. The air brake hose support bracket of claim 4, further including a projecting flange extending at an angle from the second wall at a location generally opposite of the first wall, and the projecting flange supports the second attachment member.

6. The air brake hose support bracket of claim 5, wherein the projecting flange, the first wall and the second wall cooperate to substantially align the first attachment member with a compartment of the coupler housing and to substantially align the second attachment member with the air brake hose support lug.

7. The air brake hose support bracket of claim 1, wherein the first attachment member projects inward with respect to the railway car coupler and enters into a compartment of the coupler housing below the coupler head.

8. The air brake hose support bracket of claim 1, wherein a mounting element of the first attachment member projects inward with respect to the railway car coupler and enters into a compartment of the coupler housing below the coupler head.

9. The air brake hose support bracket of claim 8, wherein the mounting element is positioned, sized and shaped to engage at least an edge surface of a compartment of the coupler housing below the coupler head.

10. The air brake hose support bracket of claim 1, wherein a movable mounting element of the first attachment member projects inward with respect to the railway car coupler and enters into a compartment of the coupler housing below the coupler head, further including at least one stop that projects inward from the first wall, and the stop engages the movable mounting element, the stop being positioned, sized and shaped to reduce rotation of the movable mounting element.

11. The air brake hose support bracket of claim 10, wherein the stop is positioned, sized and shaped to engage at least an edge surface of a compartment of the coupler housing below the coupler head.

12. The air brake hose support bracket of claim 1, wherein the second attachment member includes a shaft that passes through the air brake hose support lug.

13. The air brake hose support bracket of claim 1, wherein at least part of the air hose connector is below the underside of the bracket lower portion, the grasping feature and the air hose connector are adapted to allow movement of the air hose connector at a location lower than the underside of the bracket lower portion in response to movement of the air brake hose assembly, further including at least one stop member that limits movement of the air hose connector.

14. The air brake hose support bracket of claim 13, wherein the air hose connector is movable away from the underside of the bracket lower portion by a distance adequate to clear the stop member, whereby range of movement restriction provided by the stop member is avoided.

15. The air hose support bracket of claim 1, wherein at least a part of the air hose connector is alongside the bracket lower portion, the grasping feature and the air hose connector are adapted to allow movement of the air hose connector at a location alongside the bracket lower portion in response to movement of the hose assembly, further including at least one stop member that limits movement of the air hose connector.

16. The air brake hose support bracket of claim 1, wherein the grasping feature and the air hose connector are adapted to allow rotational movement of the air hose connector along an axis, and further including at least one stop member of the lower portion, which stop member limits rotational movement of the air hose connector in response to movement of the air brake assembly.

17. The air brake hose support bracket of claim 16, further including a shaft on the axis that joins the lower portion to the air hose connector.

18. The air brake hose support bracket of claim 16, further including a plurality of shafts that flank the axis and that engage respective slots that define the extent of rotational movement of the air hose connector along the axis.

19. The air brake hose support bracket of claim 1, wherein the grasping feature of the bracket includes a rivet that connects the air hose connector to the lower portion.

20. The air brake hose support bracket of claim 1, further including at least one stand-off inwardly facing toward the coupler and sized and shaped to engage the coupler and achieve fine-tuning of bracket installation on a particular coupler.

21. The air brake hose support bracket of claim 1, wherein the upper portion wrap-around configuration comprises an indirect wrap-around portion that includes a first wall that is upstanding with respect to the lower portion of the bracket and a free-standing wall that is upstanding with respect to the lower portion of the bracket, the first attachment member being supported by the first wall, and the second attachment member being supported by the free-standing wall, the first attachment member projects inward with respect to the railway car coupler and enters into a compartment of the coupler housing below the coupler head, and the projecting flange, the first wall and the free-standing wall cooperate to substantially align the first attachment member with the compartment of the coupler housing and to substantially align the second attachment member with the air brake hose support lug.

22. The air brake hose support bracket of claim 1, wherein the an upper wrap-around portion having a first attachment member projects into and connects to an opening into a shelf of an upper compartment of a coupler housing beneath a railway car coupler head, the upper wrap-around portion having a projecting flange, the first attachment member and the second attachment member being generally horizontally spaced from each other, as installed.

23. The air brake hose support bracket of claim 22, wherein a mounting element of the first attachment member projects inward with respect to the railway car coupler, the mounting element enters into the upper compartment and is positioned, sized and shaped to engage at least an edge surface of the shelf opening of the coupler housing.

24. The air hose support bracket of claim 1, wherein the grasping feature and the air hose connector are adapted to allow rotational movement of the air hose connector along an axis, and further including at least one stop member of the lower portion, which stop member limits rotational movement of the air hose connector in response to movement of the air brake assembly.

25. The air brake hose support bracket of claim 1, further including at least one stand-off inwardly facing toward the coupler and sized and shaped to engage the coupler and achieve fine-tuning of bracket installation on a particular coupler, the stand-off selected from the group consisting of a projecting boss, an adjustable assembly having a screw, a boss containing an adjustable assembly having a screw, a mount, a mount containing an adjustable assembly having a screw, and an oversized boss with removable end portion.

26. The air hose support bracket of claim 1, further including at least one stand-off inwardly facing toward the coupler and sized and shaped to engage the coupler and achieve fine-tuning of bracket installation on a particular coupler, the stand-off selected from the group consisting of a projecting boss, an adjustable set-screw, a boss containing an adjustable set-screw, a mount, a mount containing an adjustable set-screw, an oversized boss with removable end portion.

27. The air brake hose support bracket of claim 1, wherein a mounting element of the first attachment member projects inward with respect to the railway car coupler and enters into a compartment of the coupler housing below the coupler head.

28. The air brake hose support bracket of claim 1, wherein the first attachment member includes a non-movable mounting element that projects inward with respect to the railway car coupler and enters into a compartment of the coupler housing below the coupler head.

29. A railway car air brake hose support bracket adapted to suspend a railway air brake hose assembly from a railway car coupler, the air brake hose support bracket comprising:
an upper portion having a first attachment member that connects to a coupler housing beneath a railway car coupler head and a second attachment member that connects to an air brake hose support lug of the railway car coupler, the first attachment member and the second attachment member being laterally spaced from each other;

a lower portion that has a grasping feature inward of the railway car with respect to the coupler;

an air hose connector that is adapted and structured to engage with an air brake hose assembly, the grasping feature securely engaging the air hose connector to the lower portion, whereby the air brake hose support bracket suspends the air brake hose assembly from the railway car coupler;

a mounting element of the first attachment member projects inward with respect to the railway car coupler and enters into a compartment of the coupler housing below the coupler head, wherein the mounting element is movable, and further including at least one stop that engages the movable mounting element to limit movement of the movable mounting element.

30. The air brake hose support bracket of claim 29, wherein the upper portion is an indirect wrap-around portion that includes a first wall that is upstanding with respect to the lower portion of the bracket and a free-standing wall that is upstanding with respect to the lower portion of the bracket, the first attachment member being supported by the first wall, and the second attachment member being supported by the free-standing wall, the first attachment member projects inward with respect to the railway car coupler and enters into a compartment of the coupler housing below the coupler head, and the projecting flange, the first wall and the free-standing wall cooperate to substantially align the first attachment member with the compartment of the coupler housing and to substantially align the second attachment member with the air brake hose support lug.

31. The air brake hose support bracket of claim 29, wherein the second attachment member is an assembly that includes a shaft that passes through the air brake hose support lug.

32. A method for suspending an air brake hose assembly from a railway car coupler, comprising:

providing a railway car air brake hose support bracket with an upper first attachment member, an upper second attachment member, and a lower portion that has an air hose connector;

positioning the first attachment member into a coupler compartment below the coupler's head;

positioning the second attachment member for engagement with an air brake hose support lug of the railway car coupler;

securing the first attachment member to the coupler compartment and securing the second attachment member to the air brake hose support lug to rigidly attach the air brake hose support bracket to the railway car coupler into a wrap-around configuration that substantially aligns the first attachment member with the compartment of the coupler housing and substantially aligns the second attachment member with the air brake hose support lug; and attaching at least one railway air brake hose component to the air hose connector thereby suspending a railway air brake hose assembly from the railway car coupler.

33. The method of claim 32, wherein the positioning of the first attachment member includes entering the first attachment member into the coupler compartment and, before or after securing the first attachment member, hooking a leading portion of the first attachment member into engagement with at least one edge of an opening in a shelf of the coupler compartment.

34. The method of claim 32, wherein the securing of the air hose connector to the lower portion includes having at least part of the air hose connector below an underside of the lower portion, whereby the air brake hose assembly is movable below the installed brake hose support bracket as same suspends the air brake hose assembly from the railway car coupler.

* * * * *